United States Patent
Kikuyama et al.

(10) Patent No.: US 9,637,126 B2
(45) Date of Patent: May 2, 2017

(54) WORK VEHICLE

(71) Applicant: Komatsu Ltd., Tokyo (JP)

(72) Inventors: Yuji Kikuyama, Hiratsuka (JP); Yoshitaka Onodera, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/126,893

(22) PCT Filed: Feb. 28, 2013

(86) PCT No.: PCT/JP2013/055557
§ 371 (c)(1),
(2) Date: Aug. 13, 2014

(87) PCT Pub. No.: WO2014/132417
PCT Pub. Date: Sep. 4, 2014

(65) Prior Publication Data
US 2014/0350799 A1   Nov. 27, 2014

(51) Int. Cl.
*B60W 30/18* (2012.01)
*B66F 9/075* (2006.01)
(Continued)

(52) U.S. Cl.
CPC ........... *B60W 30/18* (2013.01); *B60L 7/14* (2013.01); *B60L 15/20* (2013.01);
(Continued)

(58) Field of Classification Search
CPC .. B60L 15/20; B60L 15/2009; B60L 2200/42; B60L 2220/12; B60L 2220/44;
(Continued)

(56) References Cited

U.S. PATENT DOCUMENTS 5,638,387 A * 6/1997 Palleggi ................ B60L 7/14
318/67
7,386,382 B2 * 6/2008 Seksaria ................ B60K 6/46
180/170

(Continued)

FOREIGN PATENT DOCUMENTS

CN    102844218 A    12/2012
JP    05-284612 A    10/1993
(Continued)

OTHER PUBLICATIONS

International Search Report dated May 21, 2013, issued for PCT/JP2013/055557.

*Primary Examiner* — Atul Trivedi
(74) *Attorney, Agent, or Firm* — Locke Lord LLP

(57) ABSTRACT

A work vehicle has a running motor and includes a first controller generating a speed command value to control the motor and adding an actual running speed of the work vehicle to a relationship between a torque command value for a torque in the motor and a running speed of the work vehicle to generate a first torque command value and a second controller generating a second torque command value based on the speed command value and the actual running speed, controls the motor using a smaller one of the first and second torque command values when the work vehicle moves forward, and controls the motor using a greater one of them when the work vehicle moves backward. The first controller determines the speed command value based on an accelerator opening used to regulate the running speed, the actual running speed, and an actual movement direction of the work vehicle.

8 Claims, 30 Drawing Sheets

(51) Int. Cl.
*B60L 15/20* (2006.01)
*B66F 9/24* (2006.01)
*B60L 7/14* (2006.01)

(52) U.S. Cl.
CPC ...... *B60L 15/2009* (2013.01); *B66F 9/07572* (2013.01); *B66F 9/24* (2013.01); *B60L 2200/42* (2013.01); *B60L 2220/12* (2013.01); *B60L 2220/44* (2013.01); *B60L 2240/12* (2013.01); *B60L 2240/14* (2013.01); *B60L 2240/423* (2013.01); *B60L 2240/642* (2013.01); *B60L 2250/28* (2013.01); *B60L 2270/145* (2013.01); *Y02T 10/645* (2013.01); *Y02T 10/72* (2013.01); *Y02T 10/7275* (2013.01); *Y02T 10/7291* (2013.01); *Y02T 90/16* (2013.01)

(58) Field of Classification Search
CPC ............. B60L 2240/12; B60L 2240/14; B60L 2240/423; B60L 2240/642; B60L 2250/28; B60L 2270/145; B60L 7/14; B60W 30/18; B66F 9/24; B66F 9/07572; Y02T 10/7275; Y02T 10/645; Y02T 10/72; Y02T 10/7291
USPC ........................................................... 701/50
See application file for complete search history.

(56) References Cited

U.S. PATENT DOCUMENTS

| | | | | |
|---|---|---|---|---|
| 8,103,418 B2 * | 1/2012 | Osswald | ................ | B62D 21/14 187/224 |
| 2007/0137338 A1 * | 6/2007 | Nishi | ................... | F16H 61/423 74/335 |
| 2008/0190680 A1 | 8/2008 | Kaneko et al. | | |
| 2009/0000839 A1 * | 1/2009 | Ishii | ....................... | A01D 34/64 180/65.51 |
| 2009/0029826 A1 * | 1/2009 | Eguchi | ...................... | B60T 7/02 477/39 |
| 2009/0260901 A1 * | 10/2009 | Ishii | ....................... | A01D 34/78 180/6.5 |
| 2009/0314564 A1 * | 12/2009 | Okamura | ............... | B60K 6/445 180/65.285 |
| 2010/0000814 A1 * | 1/2010 | Katsuta | .................. | B60K 6/387 180/65.265 |
| 2011/0166752 A1 * | 7/2011 | Dix | ....................... | F16H 61/472 701/50 |
| 2011/0301825 A1 * | 12/2011 | Grajkowski | ........... | B60K 26/04 701/102 |
| 2012/0109478 A1 * | 5/2012 | Mochiyama | .......... | B60W 10/02 701/68 |
| 2012/0159916 A1 * | 6/2012 | Ishii | ....................... | A01D 34/64 56/10.2 A |
| 2012/0310493 A1 * | 12/2012 | Fukuhara | ................ | E02F 9/202 701/50 |
| 2012/0310494 A1 * | 12/2012 | Asami | ................... | B60W 10/30 701/50 |
| 2012/0310495 A1 | 12/2012 | Nakanishi et al. | | |
| 2013/0060409 A1 | 3/2013 | Matsushita et al. | | |
| 2014/0350799 A1 * | 11/2014 | Kikuyama | .............. | B60L 15/20 701/50 |

FOREIGN PATENT DOCUMENTS

| | | |
|---|---|---|
| JP | 08-009508 A | 1/1996 |
| JP | 2001-352612 A | 12/2001 |
| JP | 2003-199214 A | 7/2003 |
| JP | 2004-215447 A | 7/2004 |
| JP | 2008-199716 A | 8/2008 |
| JP | 2010-037079 A | 2/2010 |

* cited by examiner

WORK VEHICLE

FIELD

The present invention relates to a work vehicle run by a motor.

BACKGROUND

Known work vehicles have a running motor and run after the motor receives power from a battery. As such, Patent Literature 1, for example, describes a technology relating to the running control system of a battery type vehicle.

CITATION LIST

Patent Literature

Patent Literature 1: Japanese Laid-open Patent Publication No. 8-9508

SUMMARY

Technical Problem

For example, a forklift serving as a work vehicle sometimes performs operation called switch back for loading and unloading works. The switch back refers to operation in which the actual movement direction of the work vehicle disagrees with a command used to define a movement direction. Further, for example, when the work vehicle is on a downward slope, it is likely to move forward and descend on the slope due to the steep angle of the slope or the like contrary to its intended backward movement (and vice versa). In this case, control for preventing the work vehicle from slipping down on the slope may be put into force. Therefore, there is need to perform both the switch back operation and the control for preventing the slip-down.

In a state in which the intended movement direction of the work vehicle on the downward slope disagrees with the actual movement direction, the actual movement direction of the work vehicle disagrees with the command used to define the movement direction, which creates the same situation as the switch back operation. When the switch back operation occurs during the control for preventing the work vehicle from slipping down on the slope or otherwise, there is need to switch between the two types of control or shift to another control. Therefore, conditions for switching or shifting the control become complicate, and the sudden acceleration and deceleration or the like of the work vehicle that may occur during the switch of the control are required to be suppressed. In the technology described in Patent Literature 1, a torque may suddenly fluctuate to set a current torque amount at 0 when accelerator-off regeneration (backward movement) is switched to forward movement switch back regeneration. As a result, the technology described in Patent Literature 1 may cause the occurrence of sudden acceleration and deceleration or the like in the work vehicle.

The present invention has an object of preventing sudden acceleration and deceleration or the like from occurring in a work vehicle when the work vehicle run by a motor performs switch back operation and the prevention of its slip-down on a slope at the same time.

Solution to Problem

According to the present invention, there is provided a work vehicle having at least a running motor, the work vehicle comprising: a first control part that generates a speed command value used to control the motor and adds an actual running speed of the work vehicle to a relationship between a torque command value as a command value for a torque to be generated in the motor and a running speed of the work vehicle to generate a first torque command value; and a second control part that generates a second torque command value based on the speed command value generated by the first control part and the actual running speed, controls the motor using a smaller one of the first torque command value and the second torque command value when the work vehicle moves forward, and controls the motor using a greater one of the first torque command value and the second torque command value when the work vehicle moves backward, wherein, when an actual movement direction of the work vehicle disagrees with a movement direction command value used to define a movement direction of the work vehicle, the first control part determines the speed command value based on the actual running speed generated when the disagreement occurs.

In the present invention, it is preferable that the first control part makes the speed command value greater than an absolute value of the actual running speed generated when the disagreement occurs.

In the present invention, it is preferable that the first control part prevents the speed command value from being greater than the value generated when the disagreement occurs.

In the present invention, it is preferable that the first control part makes the absolute value of the speed command value greater than 0 when the actual running speed changes from 0.

In the present invention, it is preferable that a relationship between the first torque command value and the running speed of the work vehicle changes with an accelerator opening of the work vehicle.

In the present invention, it is preferable that the first control part decreases the speed command value as the actual running speed becomes closer to 0.

In the present invention, it is preferable that a rotor has a permanent magnet in the motor.

According to the present invention, there is provided a work vehicle having at least a running motor, the work vehicle including: a first control part that generates a speed command value used to control the motor and adds an actual running speed of the work vehicle to a first relationship between a torque command value as a command value for a torque to be generated in the motor and a running speed of the work vehicle to generate a first torque command value; and a second control part that adds the actual running speed to a second relationship between the torque command value and the running speed based on the speed command value generated by the first control part to generate a second torque command value, controls the motor using a smaller one of the first torque command value and the second torque command value when the work vehicle moves forward, and controls the motor using a greater one of the first torque command value and the second torque command value when the work vehicle moves backward, wherein the first control part determines the speed command value based on an actual movement direction of the work vehicle and a movement direction command value used to define a movement direction of the work vehicle, determines, if the actual movement direction disagrees with the movement direction command used to define the movement direction of the work vehicle, the speed command value based on the speed generated when the disagreement occurs, and makes an absolute value of the speed command value greater than 0 when the actual running speed changes from 0.

According to the present invention, it is possible to prevent sudden acceleration and deceleration or the like from occurring in a work vehicle when the work vehicle run by a motor performs switch back operation and the prevention of its slip-down on a slope at the same time.

DESCRIPTION OF EMBODIMENT

A description will be given, with reference to the drawings, in detail of a mode (embodiment) for carrying out the present invention.

Figure 1:
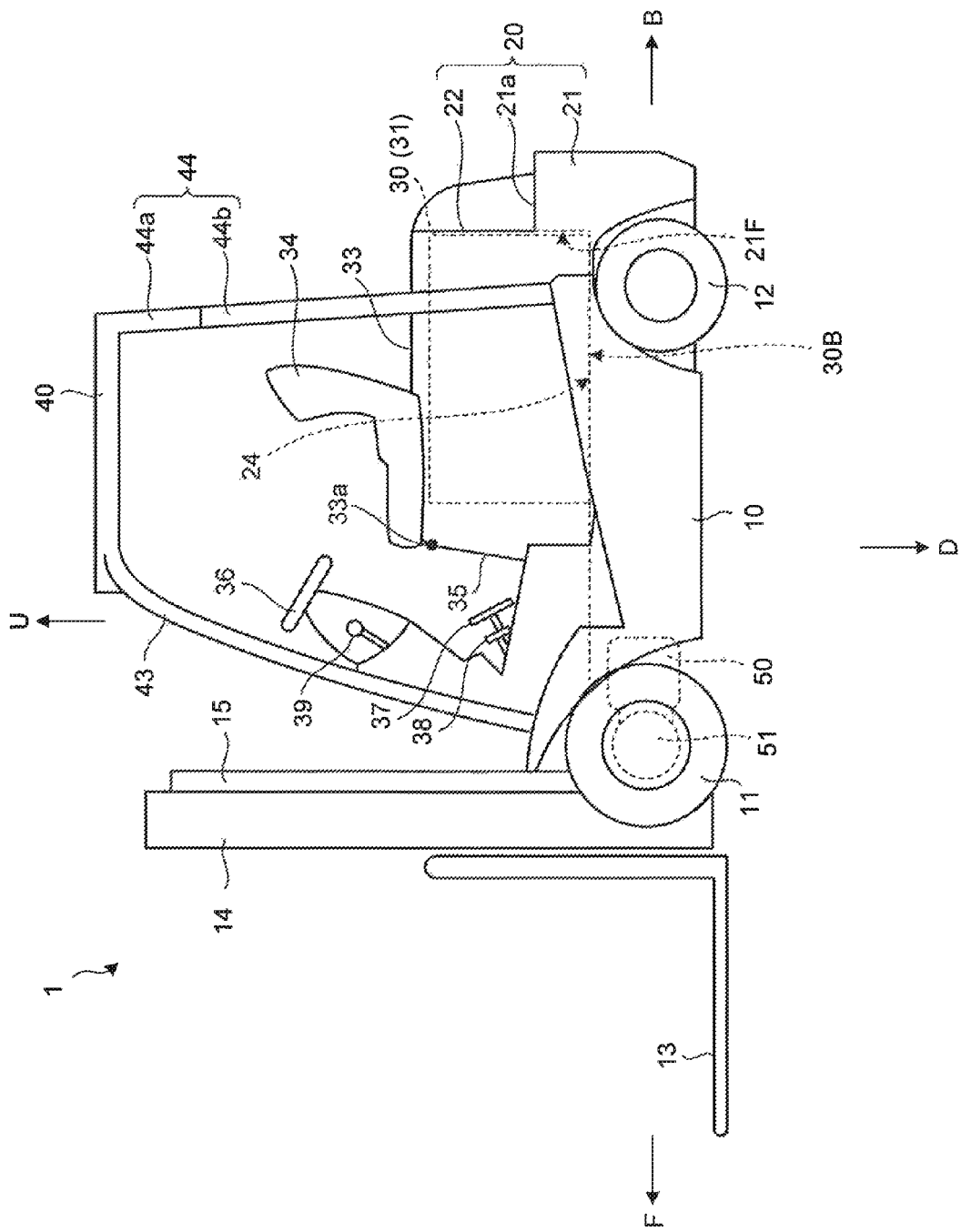
FIG. 1 is a side view illustrating a state of a work vehicle according to an embodiment as seen from the left side.
Figure 2:
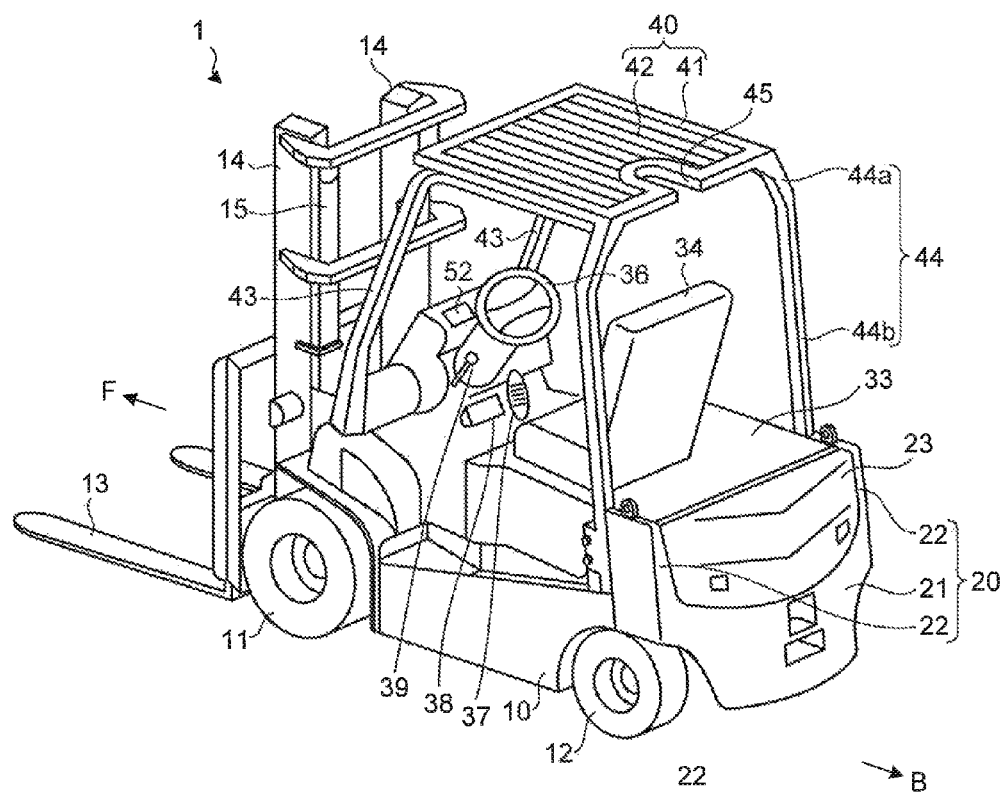
FIG. 2 is a perspective view illustrating a state of the work vehicle according to the embodiment as seen from the left backward and diagonally upper side.

FIG. 1 is a side view illustrating a state of a work vehicle according to the embodiment as seen from the left side. FIG. 2 is a perspective view illustrating a state of the work vehicle according to the embodiment as seen from the left backward and diagonally upper side. A battery type forklift 1 is described as a work vehicle run by a motor in the embodiment, but the work vehicle is not limited to this. For example, the work vehicle may be a wheel loader, an excavator, or the like driven by electric power from a battery or electric power obtained from a generator driven by an engine or the like.

In the following description, the battery type forklift 1 has the side where a fork 13 is provided as a front side F and the side where a counter weight 20 is provided as a back side B. When the work vehicle is not a battery type forklift, a side toward a steering wheel 36 serving as an operation unit from a driver's seat 34 corresponds to the front side F while a side toward the driver's seat 34 from the steering wheel 36 corresponds to the back side B. In the case of an excavator, a wheel loader, or the like, the operation unit includes an operation lever used to operate a working machine besides the steering wheel 36 used to steer the work vehicle.

In the embodiment, right and left sides represent right and left sides relative to the front side F. A right-and-left direction represents the width direction of a vehicle body 10 serving as the main body of the work vehicle. An upside U represents a side orthogonal to a plane (ground plane) contacting at least three of front wheels 11 and rear wheels 12 and toward the rotation center axes of the front wheels 11 and the rear wheels 12 from the ground plane. A downside D represents a side toward the ground plane from the rotation center axes of the front wheels 11 and the rear wheels 12. An axis directing to the back-and-forth direction of the vehicle body 10 and passing through the center in the width direction of the vehicle body 10 is represented as a back-and-forth axis, and an axis orthogonal to the back-and-forth axis and directing to the right-and-left direction of the vehicle body 10 is represented as a right-and-left axis. An axis directing to the up-and-down direction of the vehicle body 10 is represented as an up-and-down axis. The up-and-down axis is orthogonal to both of the back-and-forth axis and the right-and-left axis. In the following description, a plane view represents a state as seen from the upside U.

<General Construction of Battery Type Forklift 1>

The battery type forklift 1 includes the front wheels 11 at the front-side corners of the vehicle body 10 and the rear wheels 12 at the back-side corners thereof. The battery type forklift 1 runs when the front wheels 11 are driven by a motor (running motor) 50 provided on the back side of the front wheels 11. More specifically, the output of the running motor 50 is transmitted to both of the front wheels 11 and 11 via a power transmission device 51 having a speed reduction function to drive the same.

In the embodiment, for example, a PM (Permanent Magnet) type motor, i.e., a motor in which a rotor has a permanent magnet can be used as the running motor 50. When the PM type motor is used as the running motor 50, an SPM (Surface Permanent Magnet) type or an IPM (Interior Permanent Magnet) type may be used.

On the front side F of the vehicle body 10, the fork 13 is provided to load and unload or move packs. The fork 13 is supported by masts 14 provided along the up-and-down direction. The fork 13 moves up and down along the masts 14 when a mast cylinder 15 provided between the fork 13 and the masts 14 drives. Although not illustrated in the figures, the masts 14 are attached to the vehicle body 10 so as to be rotatable about the right-and-left axis at the lower ends thereof. In addition, the masts 14 include a tilt cylinder not shown between the masts 14 and the vehicle body 10. When the tilt cylinder drives, the masts 14 are allowed to lean forward or backward relative to the vehicle body 10.

At the back end of the vehicle body 10, the counter weight is provided. The battery type forklift 1 is a counter balancing type forklift as described above but is not limited to it. The counter weight 20 is a weight used to maintain balance when the fork 13 supports packs. The counter weight 20 is, for example, metal but is not limited to it. The counter weight 20 is disposed ranging from an area above the rear wheels 12 to the area of the back end.

As illustrated in FIG. 2, the counter weight 20 is formed to have a concave part opening in the back-and-forth direction at the upper surface thereof. Specifically, the counter weight 20 having the concave part at the upper surface thereof is formed in such a manner that a pair of column-like members 22 is protruded upward on both sides of a weight main body 21 having a flat upper surface. The column-like members 22 are convex parts that protrude from areas facing each other on both sides of the weight main body 21 to the upside U and the front side F of the vehicle body 10, and have guide surfaces parallel to each other along the back-and-forth direction of the vehicle body 10. The column-like members 22 are integrated with the weight main body 21. Note that the back surface of the counter weight 20 is covered with a resin weight cover 23.

As illustrated in FIG. 1, a battery 30 serving as a power supply is mounted at the central part of the vehicle body 10. The battery 30 is of an open type in which a plurality of battery cells is accommodated in an open state inside a rectangle battery case 31 having an open upper surface. The battery 30 is not limited to such an open type. The size of the battery case 31 along the width direction of the vehicle body 10 is slightly smaller than the mutual distance between the pair of column-like members 22. Such a structure allows the battery case 31 to pass through between the pair of column-like members 22. As illustrated in FIG. 1, the battery 30 is mounted on a battery mounting surface 24 set to be closer to the front side F than a front surface 21F of the weight main body 21 in the vehicle body 10 and set to be closer to the downside D than an upper surface 21a of the weight main body 21. The position of the battery mounting surface 24 is set such that the back end upper part of the battery 30 is interposed between the mutual column-like members 22 and overlapped with the counter weight 20 when the battery 30 is mounted on the battery mounting surface 24.

A battery hood 33 is disposed on the upside U of the battery 30 mounted on the battery mounting surface 24, and the driver's seat 34 is disposed on the upper surface of the battery hood 33. The battery hood 33 has a size enough to cover the upper surface of the battery case 31 and is supported on a support bracket 35 of the vehicle body 10 via a support shaft 33a along the right-and-left direction of the vehicle body 10 at the front end part thereof. The support bracket 35 supporting the battery hood 33 is protruded toward the upside U from an area positioned at the front end of the battery mounting surface 24. When rotated about the shaft center of the support shaft 33a, the battery hood 33 is allowed to move to a horizontal position where the upside U of the battery 30 is covered and a forward leaning position where the back end is lifted toward the upside U to open the upside U of the battery 30.

For the replacement of the battery 30, the battery hood 33 is moved to be set in the forward leaning position where the upside U of the battery 30 is open. In this state, the battery 30 is lifted toward the upside U of the vehicle body 10 and pulled out to the back side B for extraction. The charged battery 30 is moved from the back side B of the vehicle body 10 to the upside U of the battery mounting surface 24 in its suspended state and mounted on the battery mounting surface 24.

As illustrated in FIG. 1, a top plate 40 is provided on the upside U of the vehicle body 10. As illustrated in FIG. 2, the top plate 40 is formed of a substantially rectangular frame body 41 having a size to cover the upside U of the driver's seat 34 and formed of a plurality of bars 42, and the size of the top plate 40 along the width direction of the vehicle body 10 is smaller than that of the vehicle body 10. The top plate 40 is attached to the vehicle body 10 via a pair of front stays 43 and a pair of rear stays 44.

As illustrated in FIG. 1, the front stays 43 extend so as to be inclined to front side F toward the downside D from the front end corner parts of the top plate 40 with the individual lower ends thereof fixed to the front end of the vehicle body 10. The mutual interval between the front stays 43 is almost the same over their entire length. The rear stays 44 have spread parts 44a that laterally linearly protrude toward the downside D from the rear end corner parts of the top plate 40 so as to gradually separate from each other, and have stay main body parts 44b that extend toward almost the downside from the lower ends of the spread parts 44a with the individual lower ends thereof fixed to the rear end of the vehicle body 10.

The mutual interval between the stay main body parts 44b, which are disposed to be parallel to each other, of the rear stays 44 are almost the same as that between the column-like members 22, and thus the stay main body parts 44b are allowed to pass through the battery case 31 and the battery hood 33. The positions where the stay main body parts 44b and the spread parts 44a intersect each other are set at positions as high as possible such that the battery hood 33 in the horizontal position does not interfere with the rear stays 44 when moved to the forward leaning position and the battery 30 does not interfere with the battery case 31 when mounted at a battery transfer position.

The battery type forklift 1 includes an accelerator pedal 37, a brake pedal 38, and a movement direction switch lever 39. The accelerator pedal 37 is an operation member used to control the output and rotation direction of the running motor 50. The brake pedal 38 is an operation member used to stop the battery type forklift 1. The movement direction switch lever 39 is an operation member used to switch the movement direction of the battery type forklift 1 between the front side F and the back side B.

As illustrated in FIG. 2, the battery type forklift 1 includes an operations panel 52 on the front side F of the steering wheel 36. The operations panel 52 has an input part used to make various settings to the battery type forklift 1 and a display part used to display information on the state or the like of the battery type forklift 1. An operator of the battery type forklift 1 makes various settings to the battery type forklift 1 via the operations panel 52. The information on the state the like of the battery type forklift 1 displayed on the display part of the operations panel 52 includes, for example, the state of the battery 30 or the hydraulic pressure or the like of operating oil supplied to the mast cylinder 15 or the like, and the operating oil is supplied from a hydraulic pump driven by a hydraulic pump motor 55 that will be described later.

<Control System for Running Motor>

Figure 3:
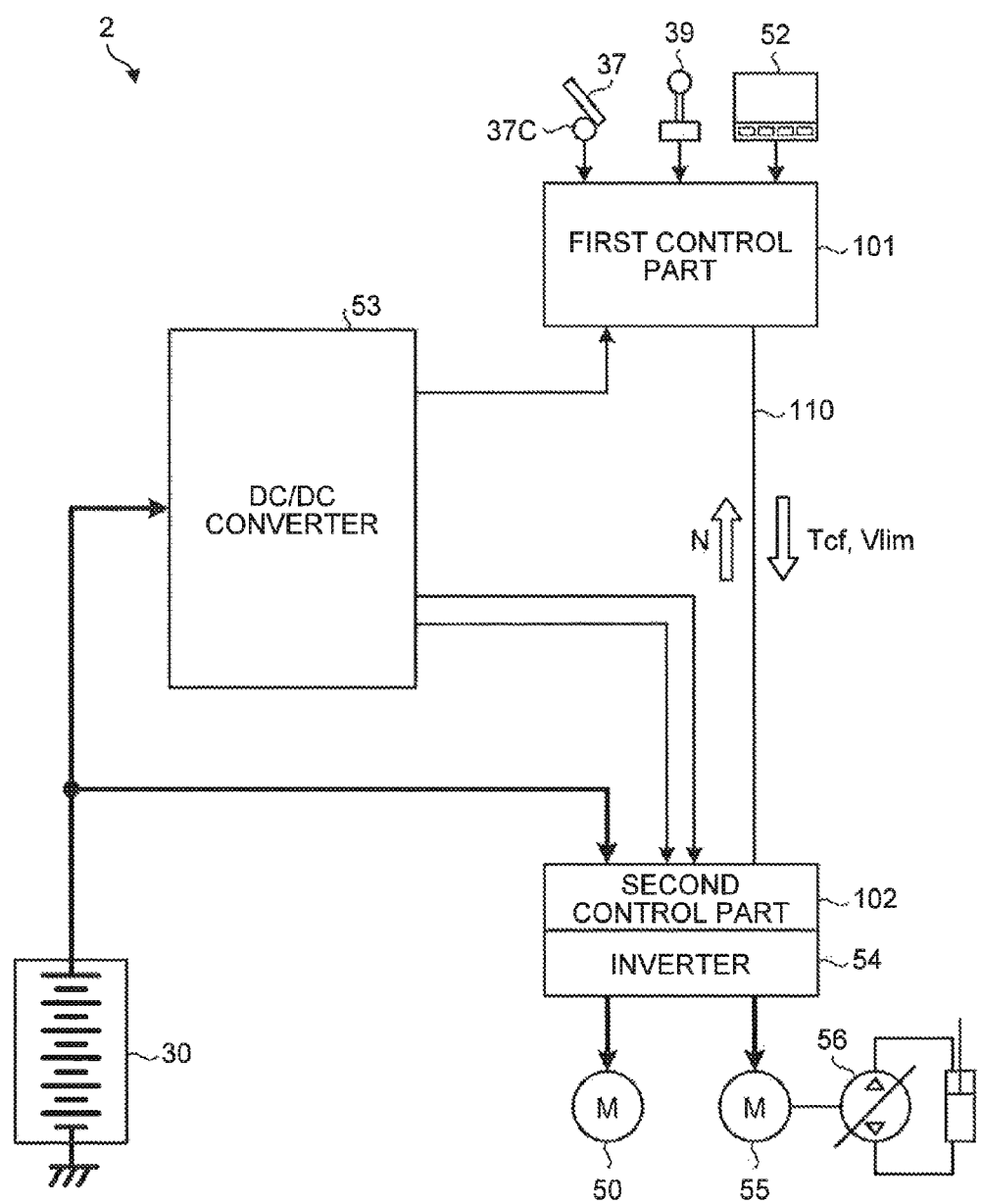
FIG. 3 is a schematic view illustrating a control system for a running motor provided in a battery type forklift according to the embodiment.

FIG. 3 is a schematic view illustrating a control system for the running motor provided in the battery type forklift according to the embodiment. A control system 2 for the running motor 50 has a first control part 101 and a second control part 102 provided in an inverter 54. The first control part 101 and the second control part 102 may be incorporated in, for example, the same control unit. The inverter 54 and the second control part 102 may be separated from each other. Electric power is supplied from the battery 30 to the first control part 101, the second control part 102, and the inverter 54 via a DC/DC converter 53. The DC/DC converter 53 converts the voltage of the battery 30 into one required by each of the first control part 101, the second control part 102, and the inverter 54 and applies the converted voltage to each of them.

The first control part 101 and the second control part 102 are computers each including a CPU (Central Processing Unit) and a memory. In response to a command from the second control part 102, the inverter 54 supplies a drive current to the running motor 50 and the hydraulic pump motor 55 that drives a hydraulic pump 56. The first control part 101 and the second control part 102 are connected to each other via a communication line 110. The communication line 110 may be an in-vehicle communication line.

The first control part 101 and the second control part 102 send and receive signals and information each other via the communication line 110. The first control part 101 sends, for example, a first torque command value Tcf as a command value for a torque generated in the running motor 50, a speed limitation command Vlim as a speed command value, or the like to the second control part 102. The second control part 102 sends, for example, a speed N of the running motor 50 (speed per unit time, hereinafter also referred to as a motor speed) acquired from the running motor 50 to the first control part 101.

The first control part 101 is connected to an accelerator opening sensor 37C, the movement direction switch lever 39, and the operations panel 52. The accelerator opening sensor 37C detects the opening of the accelerator pedal 37 and outputs the detected opening after converting it into an electric signal. The movement direction switch lever 39 outputs command values corresponding to, for example, the positions of forward movement, neutral, and backward movement. The operations panel 52 outputs new setting values, for example, when the settings of the battery type forklift 1 are changed.

<First Control Part 101 and Second Control Part 102>

Figure 4:
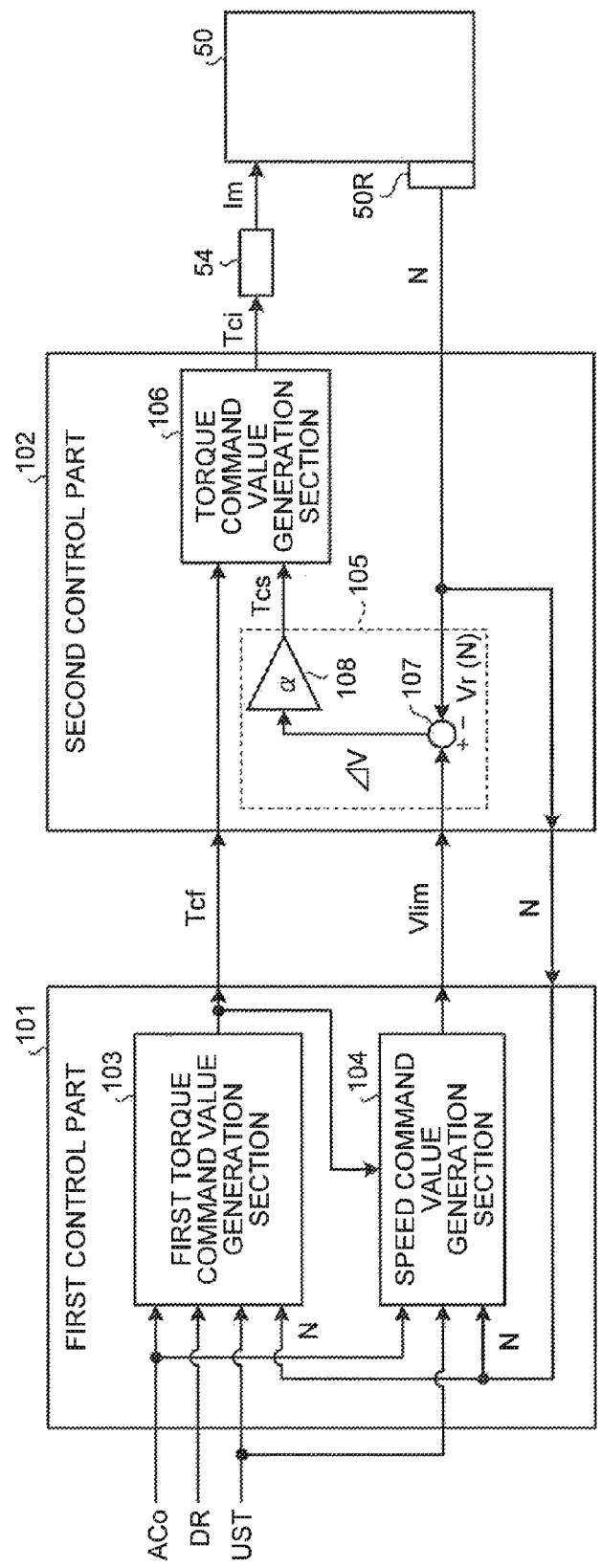
FIG. 4 is a schematic diagram illustrating a first control part and a second control part.

FIG. 4 is a schematic diagram illustrating the first control part and the second control part. The first control part 101 has a first torque command value generation section 103 and a speed command value generation section 104. The second control part 102 has a second torque command value generation section 105 and a torque command value generation section 106. The second torque command value generation section 105 has a subtraction unit 107 and a multiplication unit 108.

In the embodiment, an accelerator opening ACo, a movement direction command value DR, a setting value UST, and a motor speed N are input to the first torque command value generation section 103 of the first control part 101. Based on the inputs of these values, the first torque command value generation section 103 generates the first torque command value Tcf. The accelerator opening ACo, the setting value UST, the motor speed N, and the first torque command value Tcf are input to the speed command value generation section 104. Based on the inputs of these values, the speed command value generation section 104 generates the speed limitation command Vlim as a speed command value.

The accelerator opening ACo is a signal output from the accelerator opening sensor 37C illustrated in FIG. 3 and indicates a value corresponding to the opening of the accelerator pedal 37. The movement direction command value DR is a signal output from the movement direction switch lever 39 and used to define the movement direction of the battery type forklift 1. The setting value UST is a signal output from the operations panel 52 and corresponds to various setting values for the battery type forklift 1. The motor speed N is a signal output from a speed detection sensor 50R installed in the running motor 50 and indicates a value corresponding to the speed of the running motor 50. A resolver is, for example, used as the speed detection sensor 50R. The motor speed N can be converted into an actual speed (actual running speed) Vr at which the battery type forklift 1 runs. In other words, the motor speed N is converted into a running speed using the speed reduction ratio of the power transmission device 51 illustrated in FIG. 1 and the radiuses of the front wheels 11 (more specifically, the radiuses from the rotation centers of the front wheels 11 to a ground surface).

The speed limitation command Vlim generated by the speed command value generation section 104 and the motor speed N detected and output by the speed detection sensor 50R are input to the subtraction unit 107 of the second torque command value generation section of the second control part 102. The subtraction unit 107 calculates and outputs a difference ΔV between the speed limitation command Vlim and the motor speed N. At this time, the second control part 102 converts the motor speed N into the actual running speed Vr and inputs the same to the subtraction unit 107. The multiplication unit 108 multiplies the difference ΔV by a coefficient α and outputs a resulting value α×ΔV to the torque command value generation section 106 as a second torque command value Tcs.

The first torque command value Tcf generated by the first torque command value generation section 103 and the second torque command value Tcs generated by the second torque command value generation section 105 are input to the torque command value generation section 106. The torque command value generation section 106 outputs one of the input first torque command value Tcf and the second torque command value Tcs to the inverter 54 as a command value for a torque (actual torque command value) generated in the running motor 50. The torque command value output from the torque command value generation section 106 is referred to as a third torque command value Tci where necessary.

The third torque command value Tci generated by the torque command value generation section 106 of the second control part 102 is input to the inverter 54. The inverter 54 supplies a current required when the running motor 50 generates a torque corresponding to the third torque command value Tci to the running motor 50 as a drive current Im to drive the same.

<Control of Running Motor 50 with First Control Part 101 and Second Control Part 102>

Figure 5:
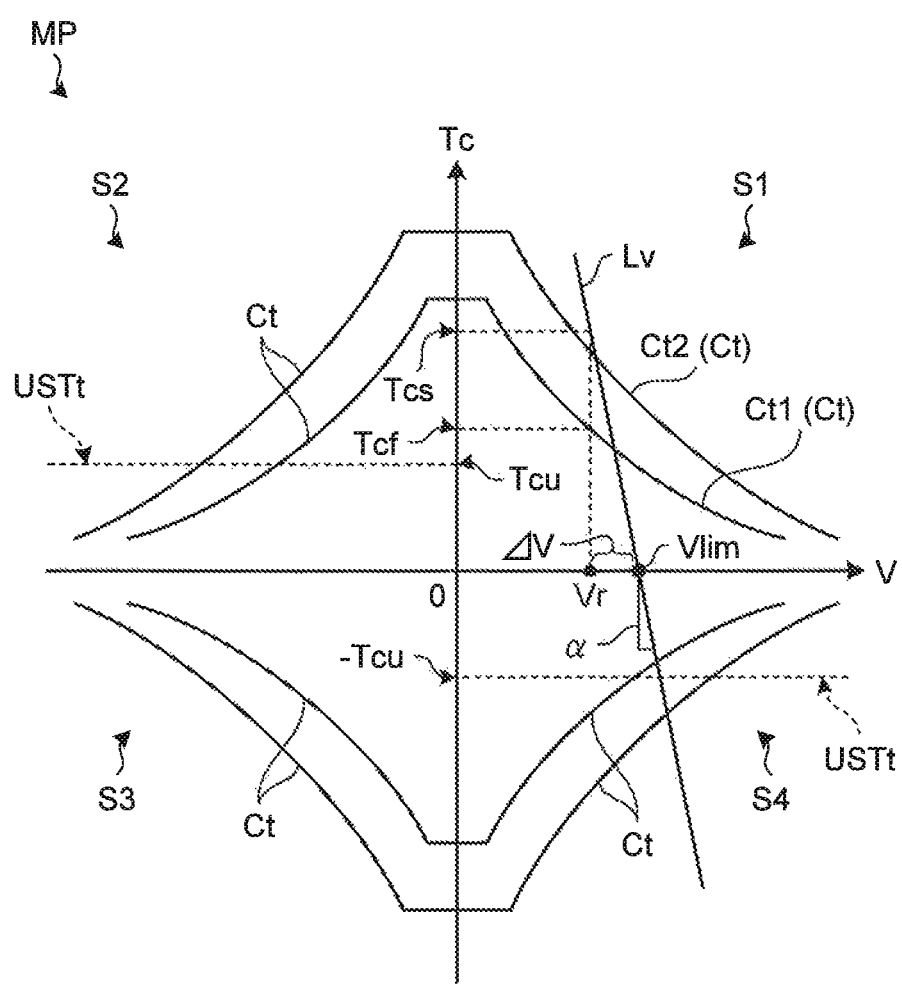
FIG. 5 is a conceptual diagram illustrating an example of a control map used when the first control part and the second control part control the running motor.
Figure 6:
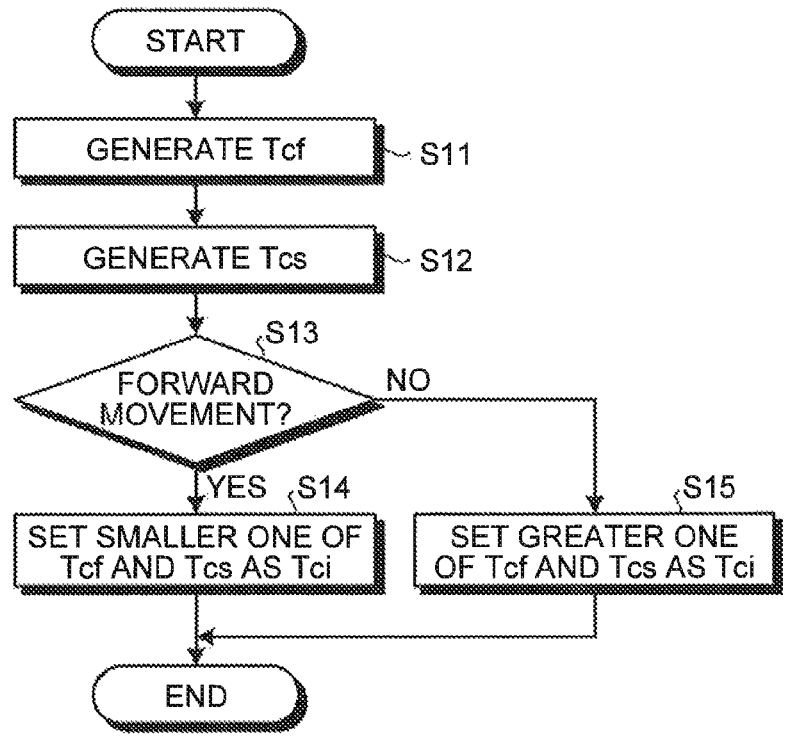
FIG. 6 is a flowchart illustrating an example of a procedure for controlling the running motor with the first control part and the second control part.

FIG. 5 is a conceptual diagram illustrating an example of a control map used when the first control part and the second control part control the running motor. FIG. 6 is a flowchart illustrating an example of a procedure for controlling the running motor with the first control part and the second control part. In the embodiment, the first control part 101 generates the first torque command value Tcf according to a control map MP (step S11). The second control part 102 generates the second torque command value Tcs based on the speed limitation command Vlim and the actual running speed Vr (step S12) and outputs one of the first torque command value Tcf and the second torque command value Tcs to the inverter 54 as the third torque command value Tci. The control map MP is described in an orthogonal coordinate system where a torque command value Tc is expressed in the vertical axis and the running speed V is expressed in the horizontal axis. As described above, the first torque command value Tcf is generated by the first control part 101, and the second torque command value Tcs is generated by the second control part 102. The control map MP illustrated in FIG. 5 is stored in, for example, the storage section of the first control part 101.

A first quadrant S1 of the control map MP describes the relationship between the running speed V and the torque command value Tc in a case in which the battery type forklift 1 performs forward movement and power running. A second quadrant S2 describes the relationship between the running speed V and the torque command value Tc in a case in which the battery type forklift 1 performs backward movement and regeneration. A third quadrant S3 describes the relationship between the running speed V and the torque command value Tc in a case in which the battery type forklift 1 performs the backward movement and the power running. A fourth quadrant describes the relationship between the running speed V and the torque command value Tc in a case in which the battery type forklift 1 performs the forward movement and the regeneration.

The first torque command value generation section 103 of the first control part 101 illustrated in FIG. 4 adds the actual running speed (hereinafter referred to as the actual running speed where necessary) Vr of the battery type forklift 1 to a relationship (hereinafter referred to as a torque command curve where necessary) Ct between the torque command value Tc as the command value for the torque generated in the running motor 50 and the running speed V of the battery type forklift 1 to generate the first torque command value Tcf (step S1). The torque command curve Ct shows the relationship between the running speed V of the battery type forklift 1 and the torque command value Tc, and the torque command value Tc is uniquely determined relative to the running speed V. In the embodiment, the torque command curve Ct is set as, for example, the tractive force curve or the braking force curve of the running motor 50. A plurality of the torque command curves Ct is set corresponding to the sizes of the accelerator opening ACo. For example, in the first quadrant S1 and the third quadrant S3 of the control map MP, i.e., at the power running, the plurality of torque command curves Ct is set to have the greater accelerator opening ACo as the absolute value of the torque command value Tc becomes greater relative to the same running speed V. In the first quadrant S1, the accelerator opening ACo of a torque command curve Ct2 is greater than that of a torque command curve Ct1. The first torque command value Tcf is a value (torque command value Tc) in the vertical axis of the control map MP obtained when the first torque command value generation section 103 adds the actual running speed Vr to the torque command curve Ct (for example, the torque command curve Ct1) corresponding to the accelerator opening ACo. As described above, the torque command curve Ct changes with the accelerator opening ACo.

The speed command value generation section 104 of the first control part 101 illustrated in FIG. 4 generates the speed limitation command Vlim. The speed limitation command Vlim is used to control the running motor 50. The speed limitation command Vlim changes with the running state of the battery type forklift 1. The speed limitation command Vlim will be described in detail later.

In the embodiment, the second torque command value generation section 105 of the second control part 102 generates the second torque command value Tcs based on the speed limitation command Vlim and the actual running speed Vr (step S12). Specifically, as described above, the second torque command value generation section 105 multiplies the difference ΔV between the speed limitation command Vlim and the actual running speed Vr by the coefficient α to generate the value α×ΔV as the second torque command value Tcs. As illustrated in FIG. 5, the coefficient α represents the inclination of a straight line (speed limitation line) passing through the speed limitation command Vlim. The second torque command value generation section 105 may have a plurality of coefficients α and change the coefficients α according to the running conditions, settings, or the like of the battery type forklift 1. If the coefficient α is constant, the second torque command value Tcs changes along the speed limitation line Lv with changes in the actual running speed Vr and the speed limitation command Vlim. The control map MP in FIG. 5 describes the speed limitation command Vlim and the speed limitation line Lv for the purpose of illustration. However, the speed limitation command Vlim and the speed limitation line Lv are not actually described in the control map MP since they are related to the generation of the second torque command value Tcs.

The torque command value generation section 106 of the second control part 102 illustrated in FIG. 4 selects one of the first torque command value Tcf and the second torque command value Tcs according to the running state of the battery type forklift 1 and outputs a selected one of them as the third torque command value Tci. In the embodiment, when the battery type forklift 1 performs the forward movement (Yes in step S13), the torque command value generation section 106 controls the running motor 50 using a smaller one of the first torque command value Tcf and the second torque command value Tcs as the third torque command value Tci (step S14). When the battery type forklift 1 performs the backward movement (No in step S13), the torque command value generation section 106 controls the running motor 50 using a greater one of the first torque command value Tcf and the second torque command value Tcs as the third torque command value Tci (step S15).

A dotted straight line passing through a torque command value Tcu or −Tcu in the control map MP and parallel to the horizontal axis represents a switch back regenerative force (braking force) USTt set by the operator of the battery type forklift 1. When the switch back regenerative force (braking force) USTt is set, the switch back regenerative force (braking force) USTt becomes an upper limit for the first torque command value Tcf. For example, the switch back regenerative force (braking force) USTt becomes the upper limit for the first torque command value Tcf regardless of the torque command curve Ct. Therefore, when the third torque command value Tci is generated based on the switch back regenerative force (braking force) USTt, the running motor 50 does not output a torque greater than the torque command value Tcu corresponding to the switch back regenerative force (braking force) USTt. As a result, the actual running speed Vr of the battery type forklift 1 is limited to a speed at which the running motor 50 outputs a torque corresponding to the torque command value Tcu.

Figure 7:
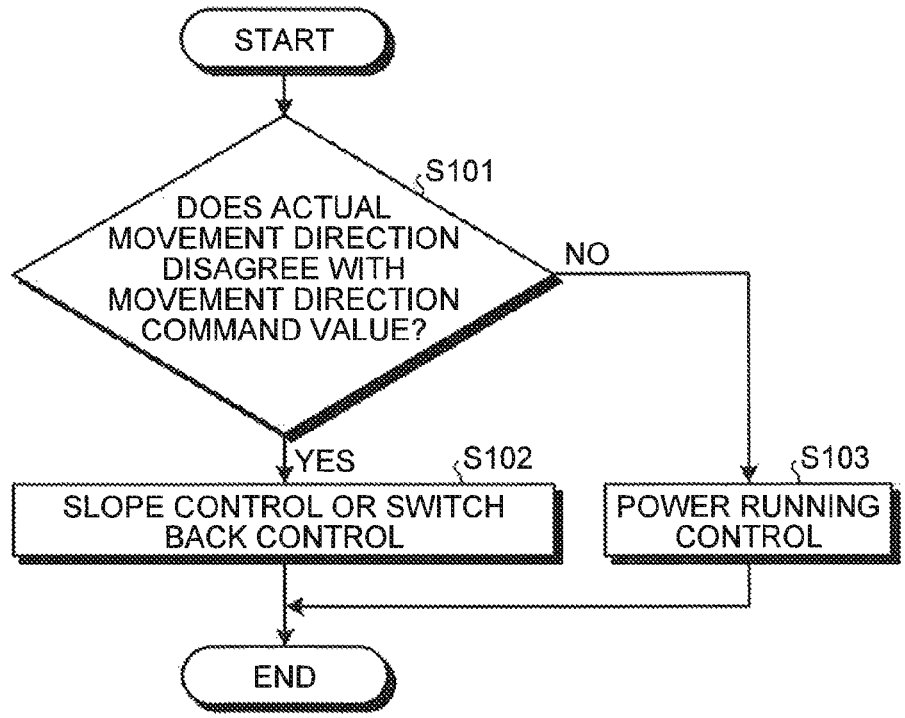
FIG. 7 is a flowchart illustrating an example of controlling the running motor according to the embodiment.

FIG. 7 is a flowchart illustrating an example of controlling the running motor according to the embodiment. In the embodiment, the first control part 101 switches between slope control, switch back control, and power running control according to the running state (including stoppage) of the battery type forklift 1 to control the running motor 50. For example, the first control part 101 determines the speed limitation command Vlim based on the actual movement direction of the battery type forklift 1 and the movement direction command value DR used to define the movement direction of the battery type forklift 1 to perform the slope control and the switch back control. The slope control refers to control for reducing a sudden increase in the actual running speed Vr if the actual movement direction of the battery type forklift 1 disagrees with the movement direction command value DR and the actual running speed Vr increases contrary to a movement direction command. The slope control is performed mainly when the battery type forklift 1 stops on a slope. The switch back control refers to control performed when the battery type forklift 1 performs switch back operation. The switch back operation refers to the operation of the battery type forklift 1 in a case in which the actual movement direction of the battery type forklift 1 disagrees with the movement direction defined by the movement direction command value DR. For example, the switch back operation is the operation performed when the position of the movement direction switch lever 39 is switched to the backward movement in a state which the battery type forklift 1 moves forward with the accelerator pedal 37 illustrated in FIGS. 1 and 2 pressed and the position of the movement direction switch lever 39 placed in the forward movement. The power running control refers to control performed when the battery type forklift 1 performs the power running, i.e., when the drive current Im is supplied to the running motor 50.

In controlling the operation of the running motor 50, the first control part 101 and the second control part 102 perform the slope control or the switch back control in step S102 if the actual movement direction of the battery type forklift 1 disagrees, in step S101, with the movement direction command value DR (the direction of the movement direction switch lever 39) (Yes in step S101). In step S103, the first control part 101 and the second control part 102 perform the power running control if the actual movement direction of the battery type forklift 1 agrees with the movement direction command value DR. Next, each of the control will be described in detail.

<Slope Control>

Figure 8:
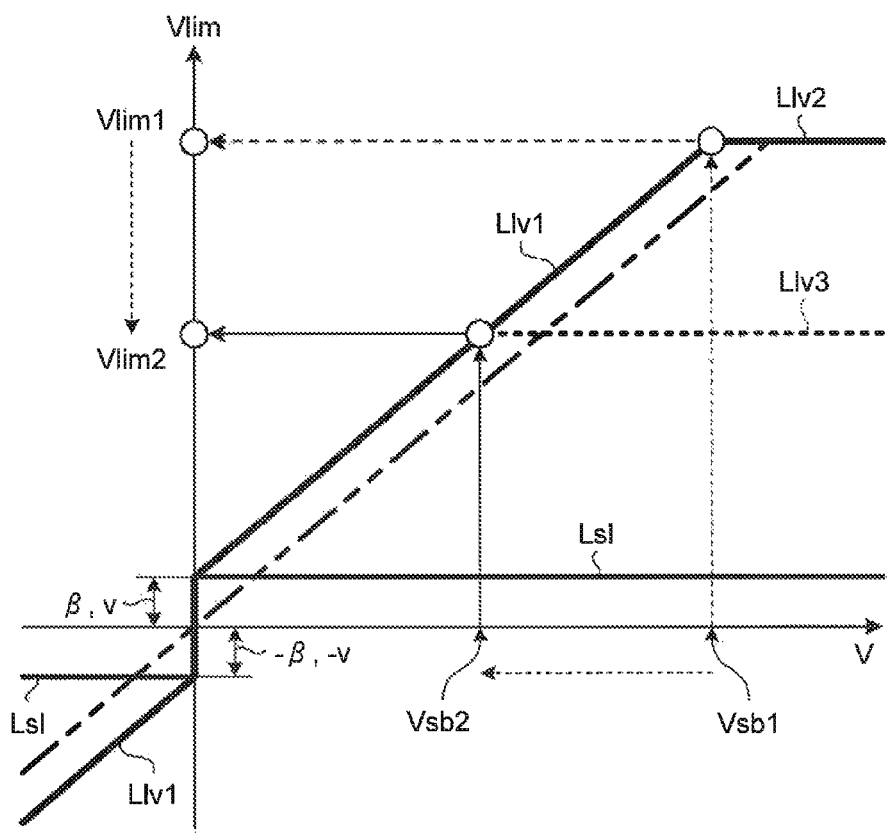
FIG. 8 is a diagram illustrating the relationship between a speed limitation command and an actual running speed under slope control and switch back control.
Figure 9:
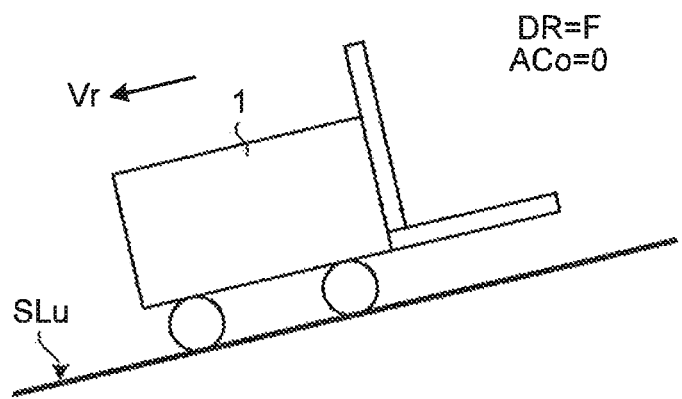
FIG. 9 is a diagram illustrating a state in which the battery type forklift is on an upward slope.
Figure 10:
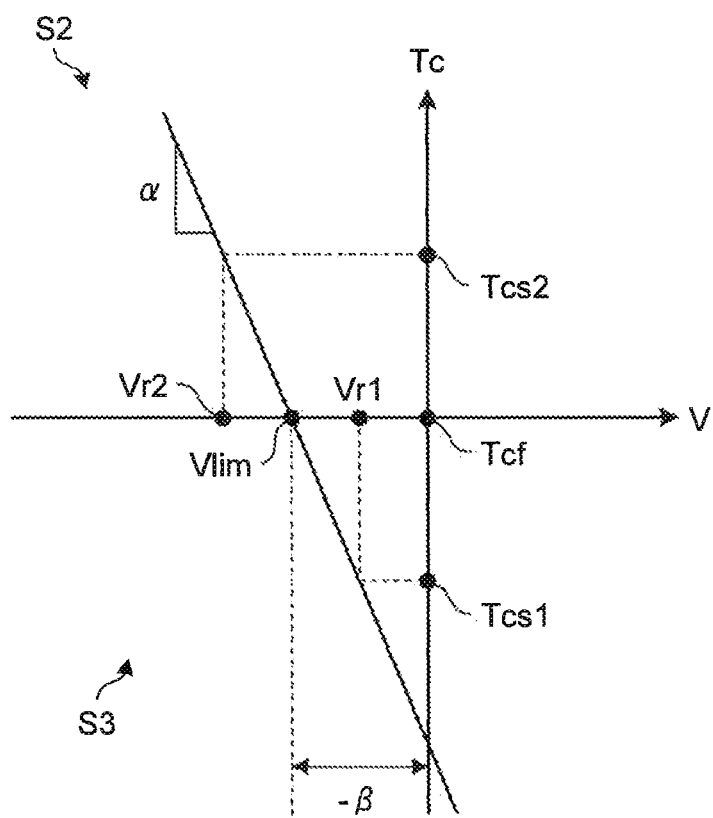
FIG. 10 is a diagram for describing a third torque command value and the operation of the battery type forklift under the slope control.

FIG. 8 is a diagram illustrating the relationship between the speed limitation command and the actual running speed under the slope control and the switch back control. FIG. 9 is a diagram illustrating a state in which the battery type forklift is on an upward slope. FIG. 10 is a diagram for describing the third torque command value and the operation of the battery type forklift under the slope control.

Figure 13:
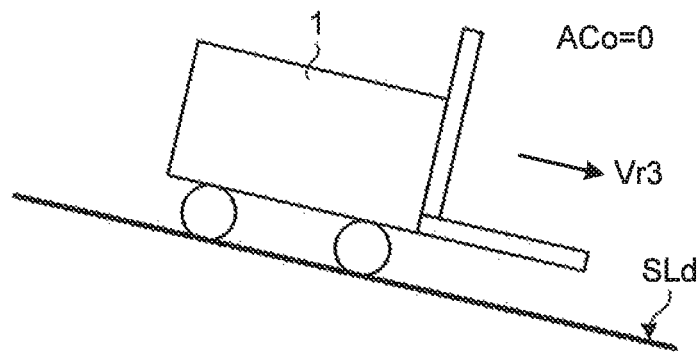
FIG. 13 is a diagram illustrating a state in which the battery type forklift is on a downward slope.

Under the slope control, the speed limitation command Vlim is set at a fixed value $\beta$ or $-\beta$ (solid line Ls1 in FIG. 8) regardless of the actual running speed Vr as illustrated in FIG. 8. The speed limitation command Vlim becomes $-\beta$ when the battery type forklift 1 is on the upward slope SLu as illustrated in FIG. 9. The speed limitation command Vlim becomes $\beta$ when the battery type forklift 1 is on a downward slope SLd as illustrated in FIG. 13. $\beta$ may be 0 so long as it is set at a fixed value, but it is, for example, about 0.5 km/h in the embodiment.

If the actual movement direction of the battery type forklift 1 disagrees with the movement direction command value DR when the battery type forklift 1 is on the upward slope SLu as illustrated in FIG. 9, the first control part 101 and the second control part 102 illustrated in FIG. 4 perform the slope control. The slope control is started mainly when the battery type forklift 1 switches its actual movement direction. In this case, the first torque command value generation section 103 of the first control part 101 sets the first torque command value Tcf at 0 as illustrated in FIG. 10 since the accelerator opening ACo is 0. The speed command value generation section 104 of the first control part 101 sets the speed limitation command Vlim at a value other than 0, specifically $-\beta$ as illustrated in FIG. 8. When the actual running speed is Vr1, i.e., when the battery type forklift 1 moves backward at Vr1 on the upward slope SLu, the second torque command value generation section 105 of the second control part 102 calculates a second torque command value Tsc1. As described above, the second torque command value Tsc1 is calculated by $\alpha \times \Delta V = \alpha \times (Vlim - Vr1)$.

In this example, the torque command value generation section 106 of the second control part 102 sets a greater one of the first torque command value Tcf and the second torque command value Tcs1 as the third torque command value Tci since the battery type forklift 1 moves backward at the actual running speed Vr1. More specifically, the third torque command value Tci=Tcf=0 is established as illustrated in FIG. 10. Therefore, the battery type forklift 1 moves backward as it gradually increases its speed.

It is assumed that the battery type forklift 1 moves backward on the upward slope SLu as it increases the speed in a state in which the accelerator opening ACo is 0 and the actual running speed Vr reaches Vr2 across the speed limitation command Vlim. The first control part 101 and the second control part 102 generate the third torque command value Tci from the first torque command value Tcf, the speed limitation command Vlim, and the actual running speed Vr2. In this case, the third torque command value Tci=Tcs2>0 is established as illustrated in FIG. 10. Since the third torque command value Tci is greater than 0 is established in the second quadrant S2 corresponding to the regeneration of the running motor 50, the running motor 50 regenerates the electric power. Since the running motor 50 generates a torque in the upward direction of the upward slope SLu with the regeneration of the electric power based on the third torque command value Tci, the speed at which the battery type forklift 1 moves backward on the upward slope SLu becomes small.

Figure 11:
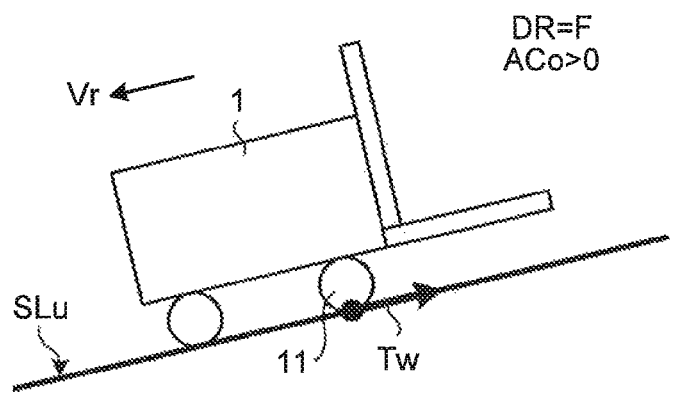
FIG. 11 is a diagram illustrating a state in which an accelerator pedal is pressed when the battery type forklift is on the upward slope.
Figure 12:
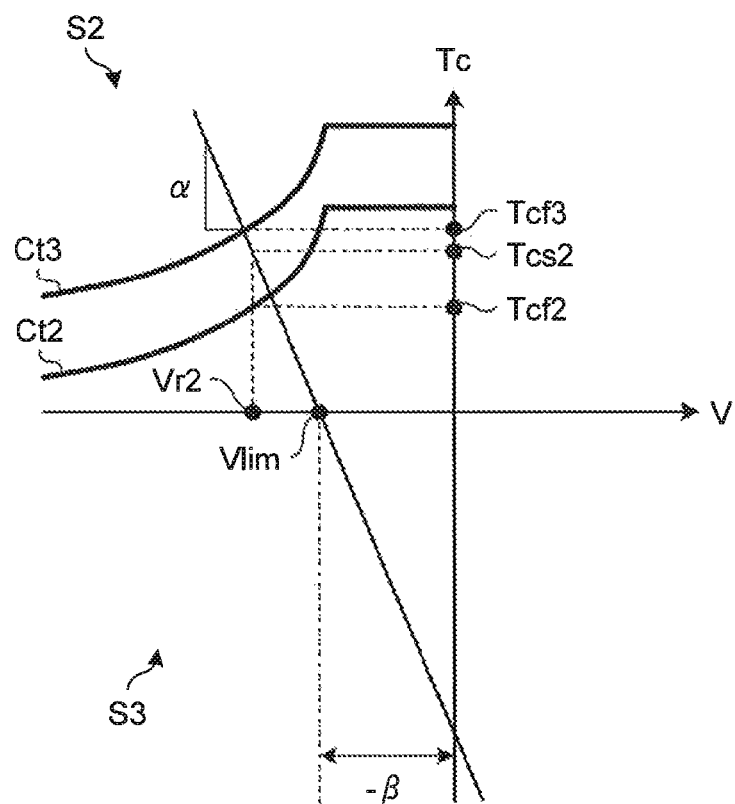
FIG. 12 is a diagram for describing the third torque command value and the operation of the battery type forklift in the state illustrated in FIG. 11.

FIG. 11 is a diagram illustrating a state in which the accelerator pedal is pressed when the battery type forklift is on the upward slope. FIG. 12 is a diagram for describing the third torque command value and the operation of the battery type forklift in the state illustrated in FIG. 11. When the accelerator pedal is pressed to make the accelerator opening ACo greater than 0 in a state in which the actual running speed is Vr2 as illustrated in FIG. 11, the front wheels 11 serving as drive wheels are caused to generate the torque Tw by the running motor 50 driven based on the third torque command value Tci. At this time, the first control part 101 generates a first torque command value Tcf2 from an actual running speed Vr2 and a torque command curve Ct2 in a second quadrant S1. The second control part 102 generates a second torque command value Tcs2 from the speed limitation command Vlim and the actual running speed Vr2. In this case, the third torque command value Tci=Tcs2>Tcf2>0 is established as illustrated in FIG. 12.

When the accelerator opening ACo becomes great, the first control part 101 generates a first torque command value Tcf3 from the actual running speed Vr2 and a torque command curve Ct3 in the second quadrant S1. The torque command curve Ct3 becomes greater than the torque command value Ct2 when the actual running speed Vr is the same. Accordingly, the first torque command value Tcf3 generated from the torque command curve Ct3 becomes greater than the first torque command value Tcf2 generated from the torque command curve Ct2. In this example, the first torque command value Tcf3 generated from the torque command curve Ct3 becomes greater than the second torque command value Tcs2 generated from the speed limitation command Vlim and the actual running speed Vr2 by the second control part 102. In this case, the third torque command value Tci=Tcf3>Tcs2>0 is established as illustrated in FIG. 12. When the third torque command value Tci overcomes running resistance produced when the battery type forklift 1 moves backward on the upward slope SLu, the battery type forklift 1 decelerates. After the deceleration, the battery type forklift 1 is caused to shift to the power running control, which will be described later, by the direction reversal of the actual running speed Vr and ascends the upward slope SLu. Next, a description will be given of a case in which the battery type forklift 1 is on a downward slope.

Figure 14:
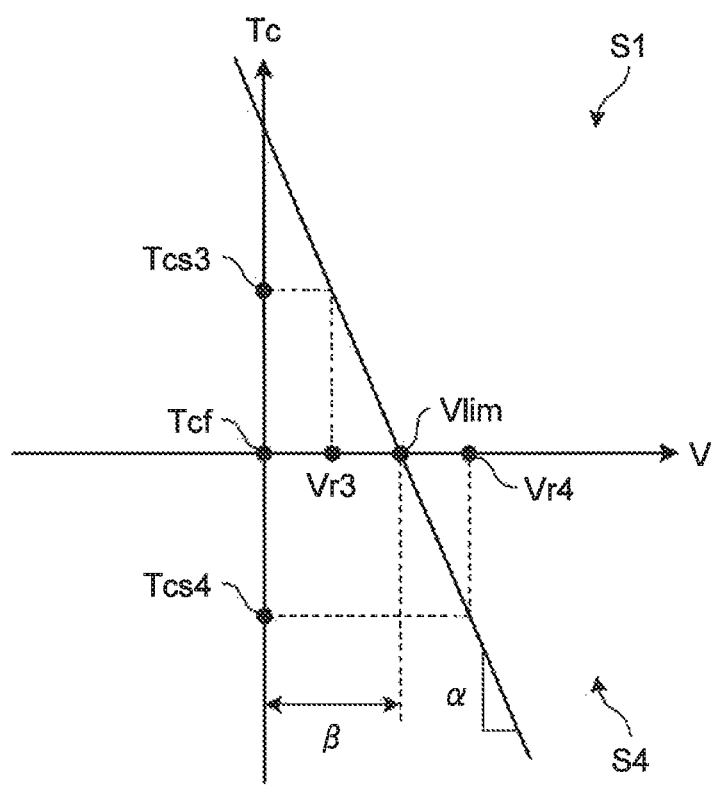
FIG. 14 is a diagram for describing the third torque command value and the operation of the battery type forklift under the slope control.

FIG. 13 is a diagram illustrating a state in which the battery type forklift is on the downward slope. FIG. 14 is a diagram for describing the third torque command value and the operation of the battery type forklift under the slope control. When the battery type forklift 1 moves forward at an actual running speed Vr3 on the downward slope SLd as illustrated in FIG. 13, the first torque command value generation section 103 of the first control part 101 sets the first torque command value Tcf at 0 since the accelerator opening ACo is 0. The speed command value generation section 104 of the first control part 101 sets the speed limitation command Vlim at a value other than 0, specifically β as illustrated in FIG. 8. When the actual running speed is Vr3 as illustrated in FIG. 14, i.e., when the battery type forklift 1 moves forward at the actual running speed Vr3 on the downward slope SLd, the second torque command value generation section 105 of the second control part 102 calculates a second torque command value Tcs3. As described above, the second torque command value Tcs3 is calculated by $\alpha \times \Delta V = \alpha \times (Vlim - Vr3)$.

In this example, the torque command value generation section 106 of the second control part 102 sets a smaller one of the first torque command value Tcf and the second torque command value Tcs3 as the third torque command value Tci since the battery type forklift 1 moves forward at the actual running speed Vr3. More specifically, the third torque command value Tci=Tcf=0 is established as illustrated in FIG. 14. Therefore, the battery type forklift 1 moves forward as it gradually increases its speed.

It is assumed that the battery type forklift 1 moves forward on the downward slope SLd as it increases the speed in a state in which the accelerator opening ACo is 0 and the actual running speed reaches Vr4 across the speed limitation command Vlim. The first control part 101 and the second control part 102 generate the third torque command value Tci from the first torque command value Tcf, the speed limitation command Vlim, and the actual running speed Vr4. In this case, the third torque command value Tci=Tcs4<0 is established as illustrated in FIG. 14. Since the third torque command value Tci is less than 0 in the fourth quadrant S4 corresponding to the regeneration of the running motor 50, the running motor 50 regenerates the electric power. Since the running motor 50 generates a torque in the upward direction of the downward slope SLd with the regeneration of the electric power based on the third torque command value Tci, the speed at which the battery type forklift 1 moves forward on the downward slope SLd becomes small.

Under the slope control according to the embodiment, the first control part 101 determines the speed limitation command Vlim based on the accelerator opening ACo and the actual running speed Vr. In addition, under the slope control according to the embodiment, the second control part 102 controls the running motor 50 using a smaller one of the first torque command value Tcf and the second torque command value Tcs when the battery type forklift 1 moves forward, and controls the motor using a greater one of the first torque command value Tcf and the second torque command value Tcs when the battery type forklift 1 moves backward. The first control part 101 performs the slope control by determining the speed limitation command Vlim based on the actual movement direction of the battery type forklift 1 and the movement direction command value DR used to define the movement direction of the battery type forklift 1. In other words, under the slope control, the first control part 101 sets the speed limitation command Vlim at +β or −β (|β|) on the condition that the actual movement direction of the battery type forklift 1 disagrees with the movement direction command value DR. In this manner, it is possible to reduce an increase in the speed at which the battery type forklift 1 descends on the downward slope.

Under the slope control according to the embodiment, the above processing allows the battery type forklift 1 to gradually descend on the slope. Therefore, the operator of the battery type forklift 1 can reliably recognize that the battery type forklift 1 is on the slope. If the running motor 50 stops in its excited state when a PM type motor is used as the running motor 50, a permanent magnet attached to a rotor generates heat, which may result in a reduction in retention. Under the slope control according to the embodiment, the battery type forklift 1 is caused to gradually move on the slope. Therefore, the rotation of the running motor 50 in its excited state can be continued. As a result, the heat generation and the reduction in the retention of the permanent magnet attached to the rotor can be prevented.

Assuming that the speed limitation command Vlim is set at 0, the sizes of the first torque command value Tcf and the second torque command value Tcs approximate each other when the actual running speed Vr is near 0, which may result in the occurrence of hunting. Therefore, under the slope control according to the embodiment, the speed limitation command Vlim is preferably set at a value other than 0, i.e., a value whose absolute value is greater than 0 (|β| in the embodiment) when the actual running speed Vr changes from 0. In this manner, the occurrence of hunting can be prevented when the slope control is performed. Note that the slope control according to the embodiment is performed regardless of the accelerator opening ACo when the position of the movement direction switch lever 39, i.e., when the movement direction command value DR disagrees with the actual movement direction of the battery type forklift 1. Next, the switch back control will be described.

Figure 15:
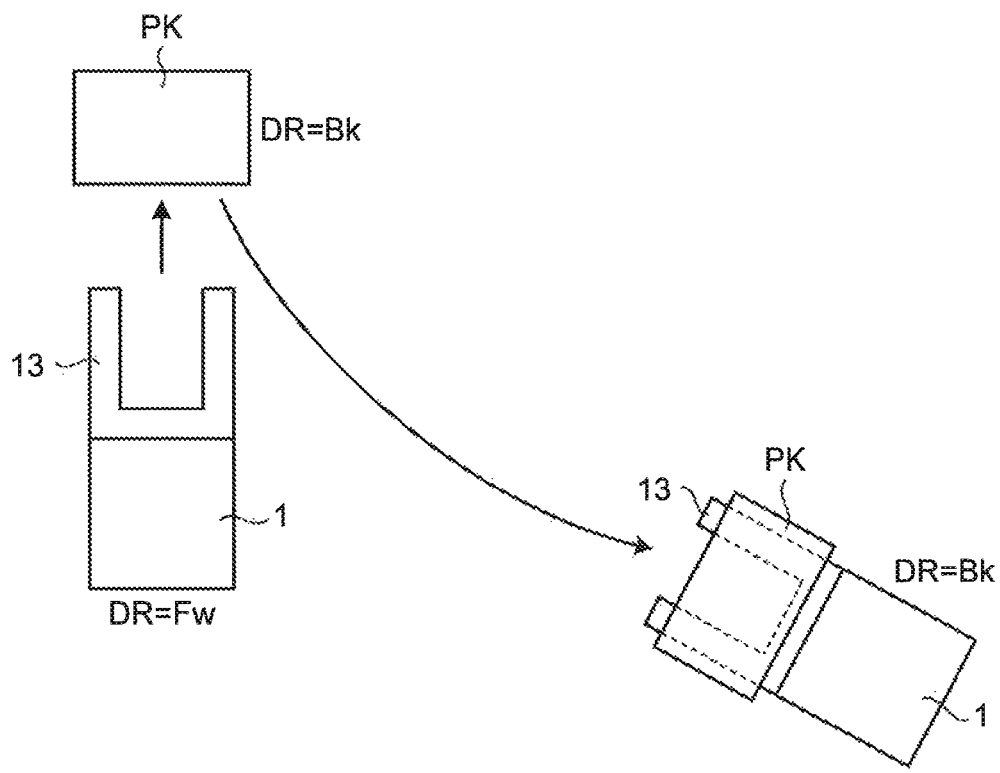
FIG. 15 is a diagram illustrating an example of switch back operation.

FIG. 15 is a diagram illustrating an example of the switch back operation. For example, at a certain timing when the battery type forklift 1 moves forward (the movement direction command value DR=Fw) and approaches a pack PK, the operator switches the position of the movement direction switch lever 39 from the forward movement to the backward movement (the movement direction command value DR=Bk). Then, at a timing at which the fork 13 is placed under the pack PK to have the pack PK mounted thereon, the battery type forklift 1 starts moving backward. Such an operation is an example of the switch back operation.

Figure 16:
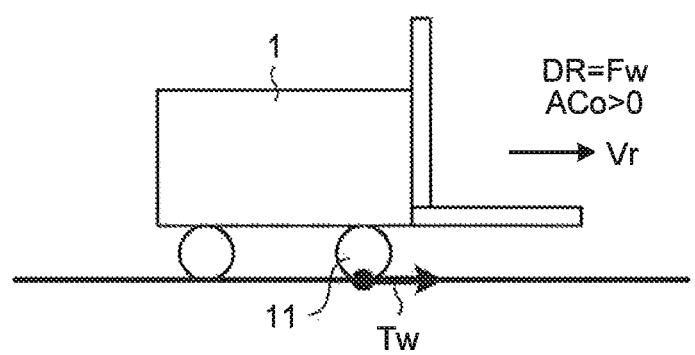
FIG. 16 is a diagram illustrating a state in which the battery type forklift performs power running and forward movement.
Figure 17:
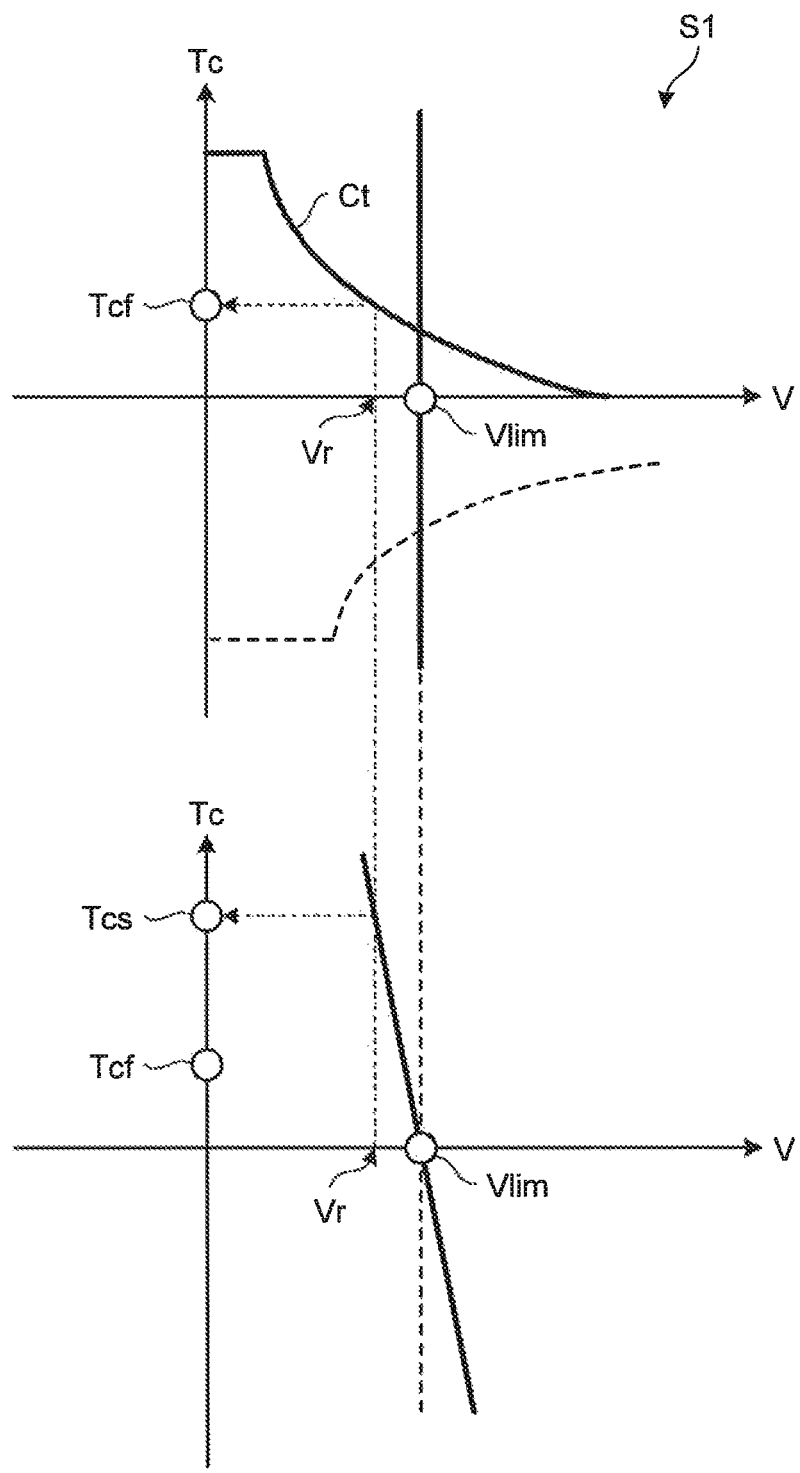
FIG. 17 is a diagram for describing a torque command value in the state in which the battery type forklift performs the power running and the forward movement.

FIG. 16 is a diagram illustrating a state in which the battery type forklift performs the power running and the forward movement. FIG. 17 is a diagram for describing the torque command value in the state in which the battery type forklift performs the power running and the forward movement. Before starting the switch back operation, the battery type forklift 1 performs the power running and the forward movement at the actual running speed Vr as illustrated in, for example, FIG. 16. At this time, the front wheels 11 serving as drive wheels are caused to generate the torque TW by the running motor 50 driven based on the third torque command value Tci. The accelerator opening ACo is greater than 0, and the movement direction command value DR is set at Fw indicating the forward movement.

Since the battery type forklift 1 performs the power running and the forward movement, the first torque command value Tcf is generated from the torque command curve Ct and the actual running speed Vr in the first quadrant S1 by the first control part 101. At this time, the speed limitation command Vlim is determined by the power running control that will be described later. The second torque command value Tcs is generated from the speed limitation command Vlim and the actual running speed Vr by the second control part 102. Since the battery type forklift 1 moves forward, the second control part 102 sets a smaller one of the first torque command value Tcf and the second torque command value Tcs, i.e., the first torque command value Tcf in this example as the third torque command value Tci. The running motor 50 is driven to generate the first torque command value Tcf by the inverter 54 illustrated in FIG. 4. Next, the switch back control will be described.

Figure 18:
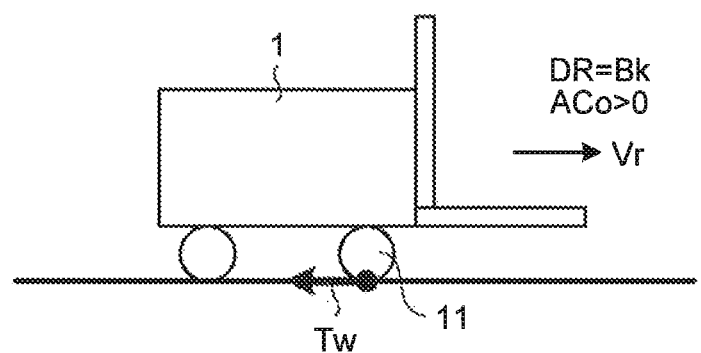
FIG. 18 is a diagram illustrating a state in which the battery type forklift starts the switch back operation.
Figure 19:
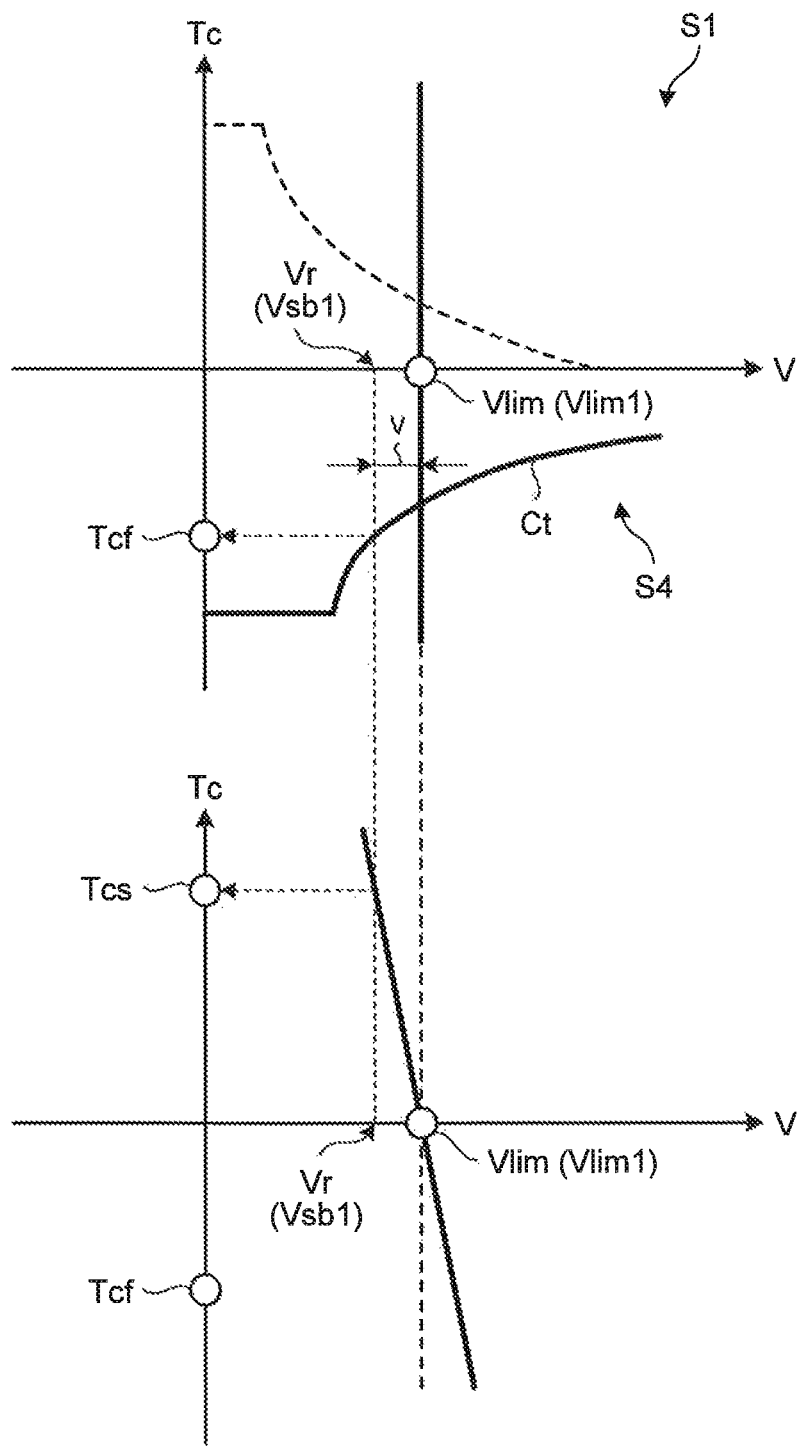
FIG. 19 is a diagram for describing the torque command value in a case in which the battery type forklift starts the switch back operation.

FIG. 18 is a diagram illustrating a state in which the battery type forklift starts the switch back operation. FIG. 19 is a diagram for describing the torque command value in the case in which the battery type forklift starts the switch back operation. As is the case with the slope control, the switch back control is performed when the actual movement direction of the battery type forklift 1 disagrees with the movement direction command value DR. The switch back control is performed mainly when the movement direction command value DR changes. The movement direction command value DR changes, for example, when the operator of the battery type forklift 1 operates the movement direction switch lever 39. The switch back control is performed by the first control part 101 and the second control part 102 illustrated in FIG. 4.

In the battery type forklift 1 illustrated in FIG. 18, the position of the movement direction switch lever 39 is switched from the forward movement to the backward movement with the accelerator pedal 37 pressed (opened) (ACo>0). Therefore, the actual movement direction of the battery type forklift 1 is the front side F, but the movement direction command value DR is set at Bk indicating the backward movement. In other words, the actual movement direction disagrees with the movement direction command value DR of the battery type forklift 1. The front wheels 11 serving as drive wheels are caused to generate the torque Tw by the running motor 50 driven based on the third torque command value Tci. At this time, the torque Tw is generated in a direction in which the battery type forklift 1 brakes, i.e., a direction opposite to a direction in which the battery type forklift 1 moves forward.

Immediately after the position of the movement direction switch lever 39 is switched from the forward movement to the backward movement, the battery type forklift 1 moves forward at the actual running speed Vr. Since the actual movement direction of the battery type forklift 1 disagrees with the movement direction command value DR (hereinafter referred to as disagreement in the movement direction where necessary), the first control part 101 and the second control part 102 perform the switch back control. Under the switch back control, the first torque command value generation section 103 of the first control part 101 generates the first torque command value Tcf using the torque command curve Ct in the fourth quadrant S4 based on the braking force curve instead of the torque command curve Ct in the first quadrant S1 based on the tractive force curve used under the power running control. As is clear from FIG. 19, the first torque command value Tcf is a negative value.

Under the switch back control, the speed limitation command Vlim is set to be greater than the absolute value of the actual running speed Vr at a time at which the disagreement in the movement direction occurs in the battery type forklift 1. In the embodiment, as illustrated in FIGS. 19 and 8, the speed command value generation section 104 of the first control part 101 sets as the speed limitation command Vlim (Vlim1) a value obtained by adding any speed v to the actual running speed Vr (Vsb1) at the time at which the disagreement in the movement direction occurs in the battery type forklift 1. The second control part 102 generates the second torque command value Tcs from the speed limitation command Vlim (Vlim1) and the actual running speed Vr (Vsb1). Since the battery type forklift 1 moves forward, the second control part 102 sets a smaller one of the first torque command value Tcf and the second torque command value Tcs, i.e., the first torque command value Tcf in this example as the third torque command value Tci. The running motor 50 is driven to generate the first torque command value Tcf by the inverter 54 illustrated in FIG. 4.

Figure 20:
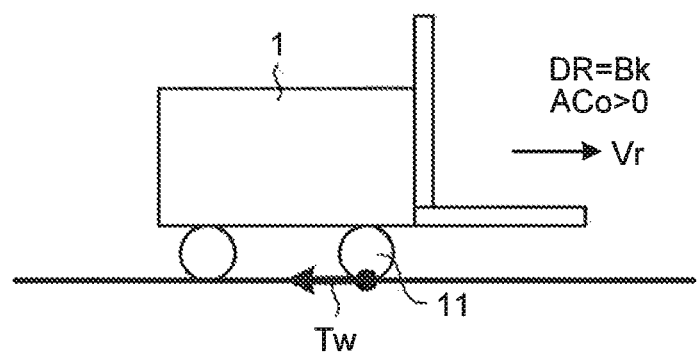
FIG. 20 is a diagram illustrating the battery type forklift in the switch back operation.
Figure 21:
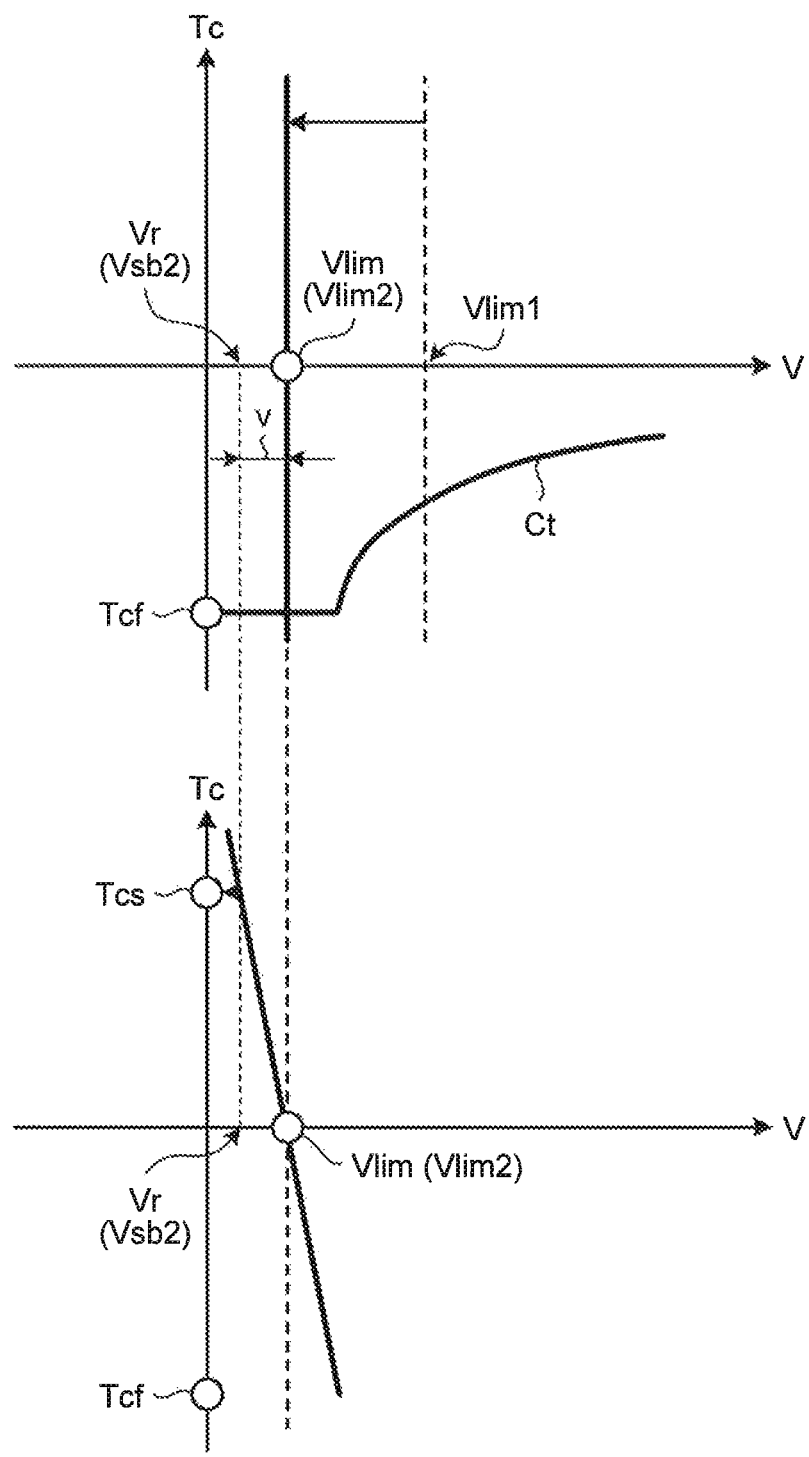
FIG. 21 is a diagram for describing the torque command value in the switch back operation.

FIG. 20 is a diagram illustrating the battery type forklift in the switch back operation. FIG. 21 is a diagram for describing the torque command value in the switch back operation. The battery type forklift 1 illustrated in FIG. 20 is caused to gradually decelerate by the torque Tw generated by the front wheels 11, i.e., a regenerative braking torque. The regenerative braking torque is a torque for moving the battery type forklift 1 in a direction opposite to a current movement direction. When the actual running speed Vr in a forward movement direction decreases, the accelerator opening ACo is greater than 0 and the movement direction command value DR is set at Bk indicating the backward movement.

Also when the battery type forklift 1 decelerates in a state in which the position of the movement direction switch lever 39 is placed in the backward movement and the accelerator opening ACo is greater than 0, the first torque command value generation section 103 of the first control part 101 generates the first torque command value Tcf using the torque command curve Ct in the fourth quadrant based on the braking force curve. In the embodiment, when the actual running speed Vr (Vsb2) becomes smaller than the actual running speed Vr (Vsb1) at the time at which the disagreement in the movement direction occurs in the battery type forklift 1 as illustrated in FIGS. 21 and 8, the speed command value generation section 104 of the first control part 101 makes the speed limitation command Vlim smaller than the speed limitation command Vlim1 at the time at which the disagreement in the movement direction occurs to be set at Vlim2. In other words, the speed limitation command Vlim is caused to decrease as the actual running speed Vr becomes closer to 0. In this case, the difference between the speed limitation command Vlim2 and the actual running speed Vsb2 is the speed v as illustrated in FIGS. 21 and 8. More specifically, in the embodiment, when the actual running speed Vr decreases, the speed limitation command Vlim follows the actual running speed Vr at a value greater than the actual running speed Vr by the speed v. The speed v may be 0 but is preferably set at a value whose absolute value is greater than 0 since the occurrence of hunting can be prevented under the switch back control.

As described above, in the embodiment, the first control part 101 does not make the speed limitation command Vlim greater than the value generated when the disagreement in the movement direction occurs in the battery type forklift 1. In other words, in the embodiment, the speed limitation command Vlim changes only in the direction in which it decreases along a solid line Llv1 illustrated in FIG. 8. In this manner, the battery type forklift 1 can be prevented from accelerating again after temporarily decelerating.

The second control part 102 generates the second torque command value Tcs from the speed limitation command Vlim (Vlim2) and the actual running speed Vr (Vsb2). Since the battery type forklift 1 moves forward, the second control part 102 sets a smaller one of the first torque command value Tcf and the second torque command value Tcs, i.e., the first torque command value Tcf in this example as the third torque command value Tci. The running motor 50 is driven to generate the first torque command value Tcf by the inverter 54 illustrated in FIG. 4.

Figure 22:
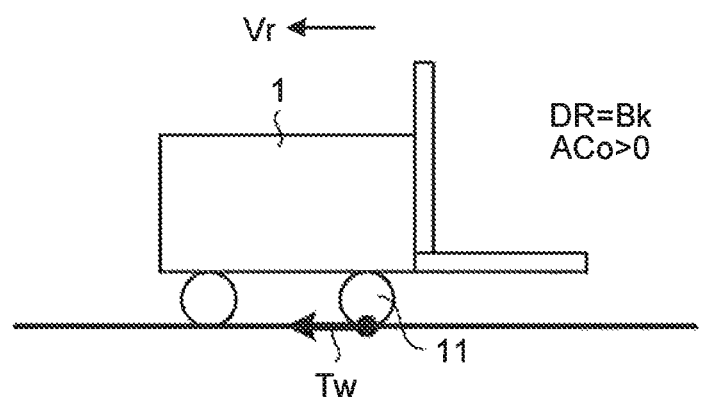
FIG. 22 is a diagram illustrating the battery type forklift caused to reversely move by deceleration.
Figure 23:
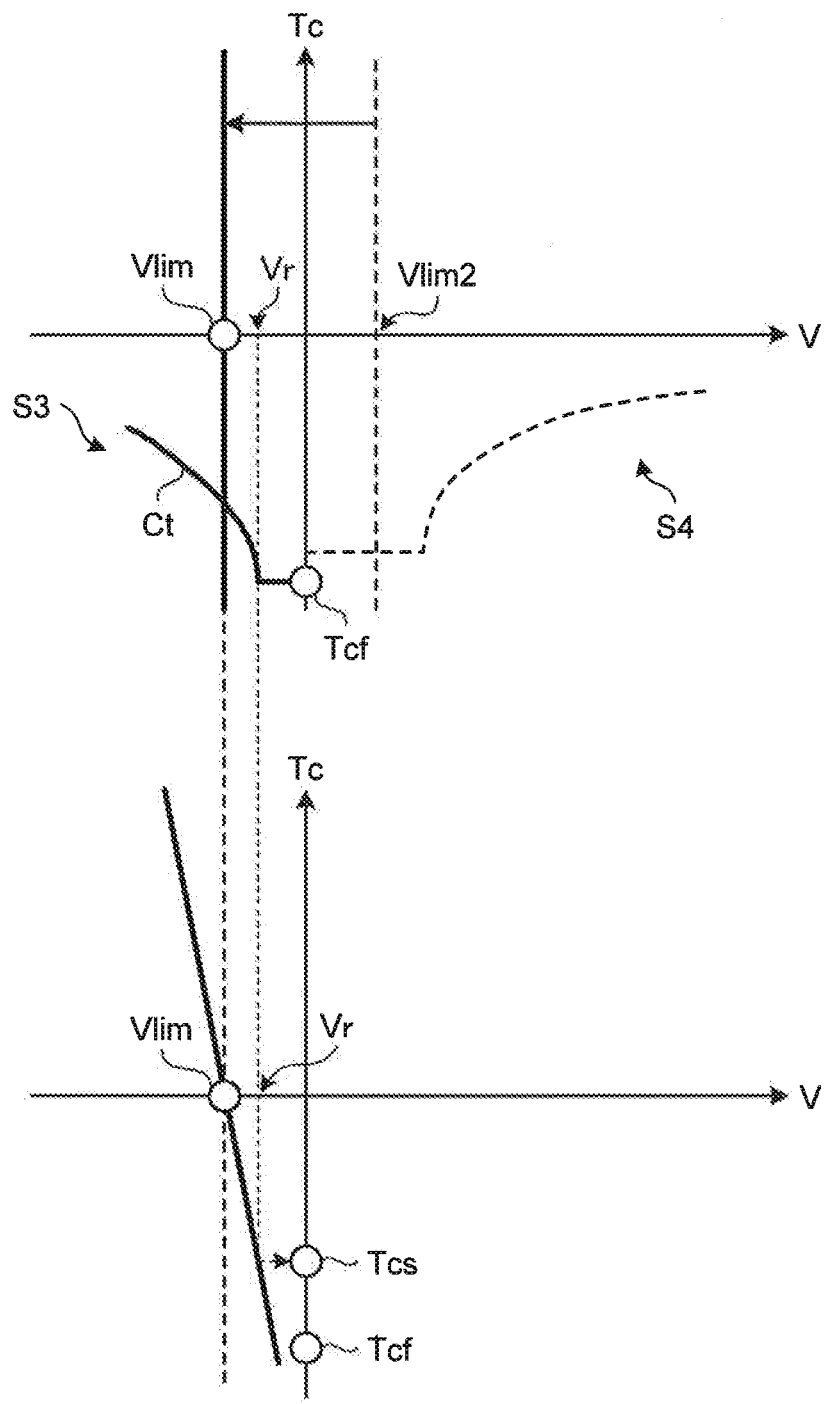
FIG. 23 is a diagram for describing the torque command value in a case in which the movement direction is reversed by deceleration.

FIG. 22 is a diagram illustrating the battery type forklift caused to reversely move by deceleration. FIG. 23 is a diagram for describing the torque command value in a case in which the movement direction is reversed by deceleration. The battery type forklift 1 illustrated in FIG. 22 is caused to gradually decelerate by the torque Tw generated by the front wheels 11, i.e., the regenerative braking torque and changes its movement direction from the forward movement to the backward movement. Therefore, the actual movement direction of the battery type forklift 1 agrees with the movement direction command value DR. The accelerator opening ACo is greater than 0, and the movement direction command value DR is set at Bk indicating the backward movement.

When the battery type forklift 1 moves backward at the actual running speed Vr in a state in which the position of the movement direction switch lever 39 is placed in the backward movement and the accelerator opening ACo is greater than 0, the first control part 101 and the second control part 102 control the running motor 50 based on the power running control for the backward movement. The first torque command value generation section 103 of the first control part 101 generates the first torque command value Tcf using the torque command curve Ct in the third quadrant S3 based on the tractive force curve instead of the torque command curve Ct in the fourth quadrant S4 based on the braking force curve used under the switch back control. As is clear from FIG. 23, the first torque command value Tcf is a negative value.

The speed command value generation section 104 of the first control part 101 generates the speed limitation command Vlim based on the power running control for the backward movement. The second control part 102 generates the second torque command value Tcs from the speed limitation command Vlim and the actual running speed Vr. Since the battery type forklift 1 moves backward, the second control part 102 sets a greater one of the first torque command value Tcf and the second torque command value Tcs, i.e., the second torque command value Tcs in this example as the third torque command value Tci. The running motor 50 is driven to generate the second torque command value Tcs by the inverter 54 illustrated in FIG. 4. The above description assumes a case in which the accelerator opening ACo is greater than 0. However, as is the case with the slope control, the switch back control is performed when the actual movement direction of the battery type forklift 1 disagrees with the movement direction command value DR regardless of the accelerator opening ACo (the same applies hereafter). Next, a description will be given of an example in which the battery type forklift 1 runs on the downward slope after starting the switch back control illustrated in FIGS. 24 and 25.

Figure 24:
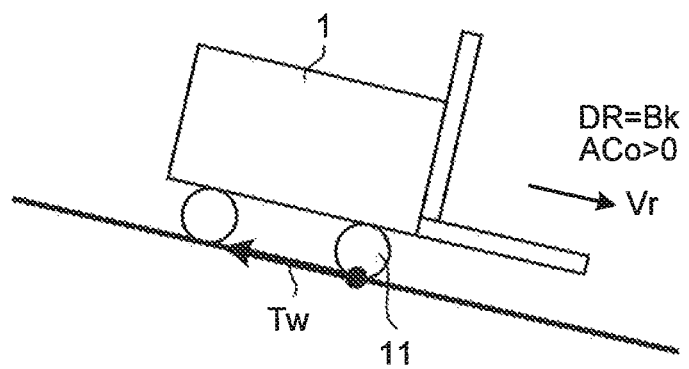
FIG. 24 is a diagram illustrating the battery type forklift that runs on the downward slope after starting the switch back control.
Figure 25:
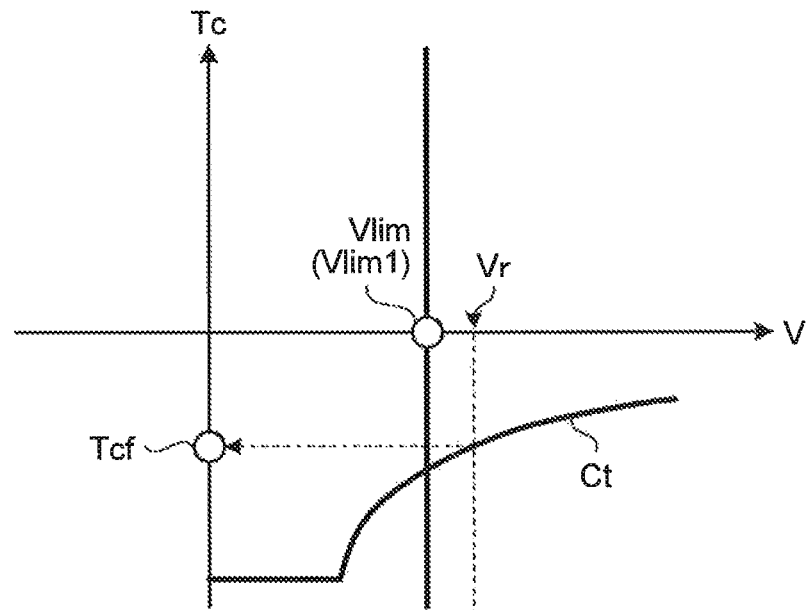
FIG. 25 is a diagram for describing the torque command value in a case in which the battery type forklift runs on the downward slope after starting the switch back control.
Figure 25:
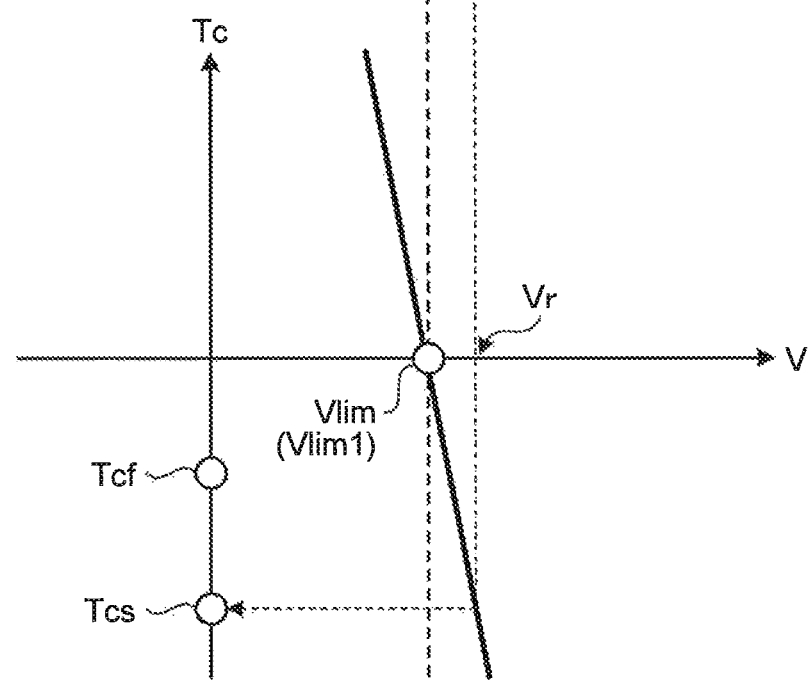

FIG. 24 is a diagram illustrating the battery type forklift that runs on the downward slope after starting the switch back control. FIG. 25 is a diagram for describing the torque command value in a case in which the battery type forklift runs on the downward slope after starting the switch back control. In the battery type forklift 1 illustrated in FIG. 24, the position of the movement direction switch lever 39 is switched from the forward movement to the backward movement (DR=Bk) with the accelerator pedal 37 pressed (ACo>0). Therefore, the first control part 101 and the second control part 102 perform the switch back control. Since the battery type forklift 1 runs on the downward slope, the actual running speed Vr increases.

When the actual running speed Vr increases, the speed command value generation section 104 of the first control part 101 does not change the speed limitation command Vlim as indicated by a line Llv2 in FIGS. 25 and 8. In other words, in the embodiment, the speed command value generation section 104 does not make the speed limitation command Vlim greater than the speed limitation command Vlim1 generated at the time at which the battery type forklift 1 shifts to the switch back control with the occurrence of the disagreement in the movement direction in the battery type forklift 1. In this manner, an increase in the actual running speed Vr due to the shortage of the third torque command value Tci can be prevented. The shortage of the third torque command value Tci may be caused, for example, when the accelerator opening ACo is insufficient, the slope is steeply inclined, or the switch back regenerative force (braking force) USTt illustrated in FIG. 5 is different for each user.

Under the switch back control according to the embodiment, a sudden change in the torque generated by the running motor 50 is prevented since the first torque command value Tcf is set as the third torque command value Tci until the actual running speed Vr exceeds at least the speed limitation command Vlim. In addition, the switch between the first torque command value Tcf and the second torque command value Tcs becomes smooth since a line having an inclination α passing through the speed limitation command Vlim crosses the torque command curve Ct in the fourth quadrant S4. Therefore, the sudden change in the torque generated by the running motor 50 is prevented. Since the generation of the first torque command value Tcf, the second torque command value Tcs, and the third torque command value Tci are described above, their duplicated description will be omitted.

When the speed limitation command Vlim is caused to change so as to decrease as indicated by a dotted line Llv3 in FIG. 8, the speed command value generation section 104 may prevent the speed limitation command Vlim from exceeding the changed speed limitation command Vlim (Vlim2 in the example illustrated in FIG. 8). In this manner, the battery type forklift 1 can be prevented from accelerating again after temporarily decelerating. Next, a description will be given of an example of shifting to the switch back control during the slope control.

Figure 26:
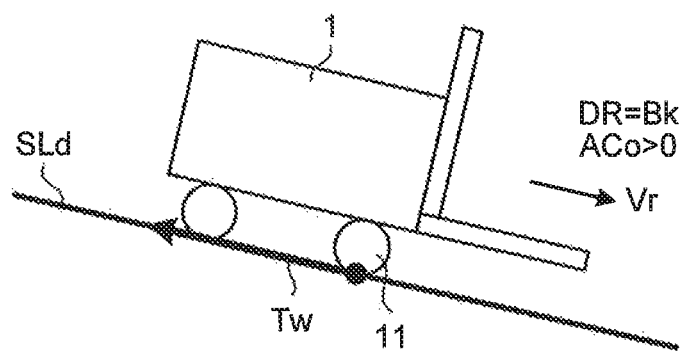
FIG. 26 is a diagram illustrating a state in which the battery type forklift moves backward on the downward slope with the accelerator pedal pressed.
Figure 27:
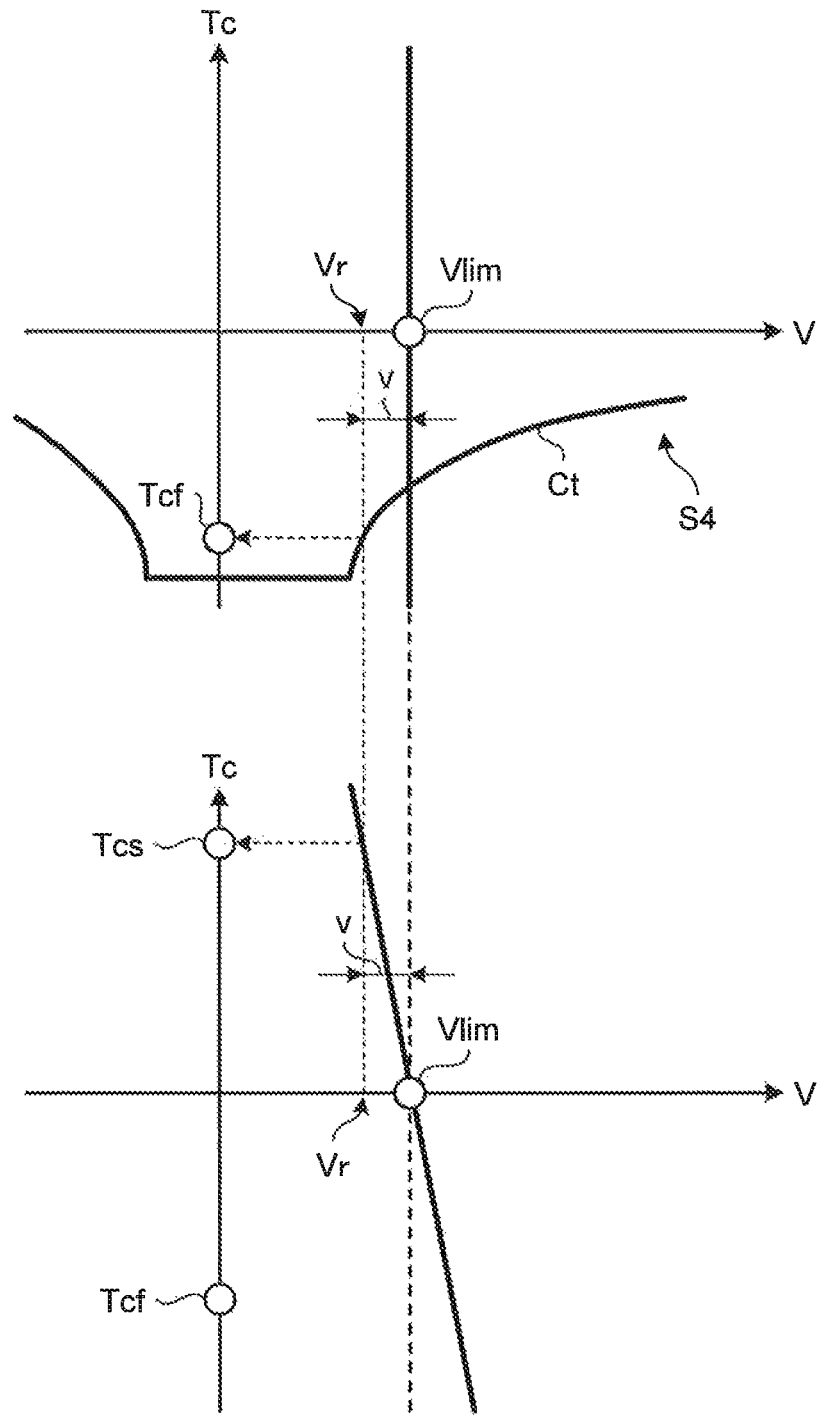
FIG. 27 is a diagram for describing the torque command value in the state in which the battery type forklift moves backward on the downward slope with the accelerator pedal pressed.

FIG. 26 is a diagram illustrating a state in which the battery type forklift moves backward on the downward slope with the accelerator pedal pressed. FIG. 27 is a diagram for describing the torque command value in the state in which the battery type forklift moves backward on the downward slope with the accelerator pedal pressed. Consideration is given to a case in which the slope control illustrated in FIG. 14 is performed when the battery type forklift 1 is on the downward slope SLd with the position of the movement direction switch lever 39 placed in the forward movement as illustrated in FIG. 13. Here, the battery type forklift 1 is in a state of gradually moving forward and descending on the downward slope SLd. At this time, it is assumed that the operator switches the position of the movement direction switch lever 39 to be placed in the backward movement, i.e., in a direction opposite to the current movement direction, and presses the accelerator pedal 37. Then, as illustrated in FIG. 26, the battery type forklift 1 moves forward at the actual running speed Vr, but the movement direction command value DR is switched from Fw to Bk. In this case, since the actual movement direction of the battery type forklift 1 disagrees with the movement direction command value DR with the change in the movement direction command value DR, the switch back control is performed.

Since the disagreement in the movement direction occurs in the battery type forklift 1, the first control part 101 and the second control part 102 perform the switch back control. In performing the switch back control, the first torque command value generation section 103 of the first control part 101 generates the first torque command value Tcf using the torque command curve Ct in the fourth quadrant S4 based on the braking force curve. As illustrated in FIG. 27, the speed command value generation section 104 of the first control part 101 sets a value, which is obtained by adding the speed v to the actual running speed Vr at a time at which the disagreement in the movement direction occurs in the battery type forklift 1, as the speed limitation command Vlim. The second control part 102 generates the second torque command value Tcs from the speed limitation command Vlim and the actual running speed Vr. Since the battery type forklift 1 moves forward, the second control part 102 sets a smaller one of the first torque command value Tcf and the second torque command value Tcs, i.e., the first torque command value Tcf in this example as the third torque command value Tci. The running motor 50 is controlled to generate the first torque command value Tcf by the inverter 54 illustrated in FIG. 4.

The switch back control according to the embodiment sets the value, which is obtained by adding the speed v to the actual running speed Vr at the time at which the disagreement in the movement direction occurs in the battery type forklift 1, as the speed limitation command Vlim. In this manner, since the first torque command value Tcf based on the braking force curve or the like is set as the third torque command value Tci as illustrated in FIG. 27, the running motor 50 can give a sense of acceleration corresponding to the operation of the accelerator pedal 37 to the operator.

Figure 28:
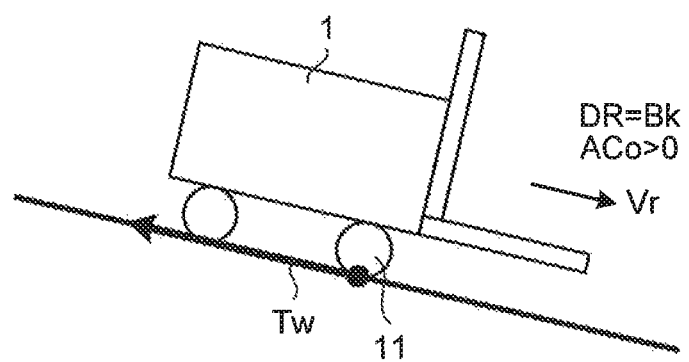
FIG. 28 is a diagram illustrating a state in which the switch back control is performed when the battery type forklift is on the downward slope.
Figure 29:
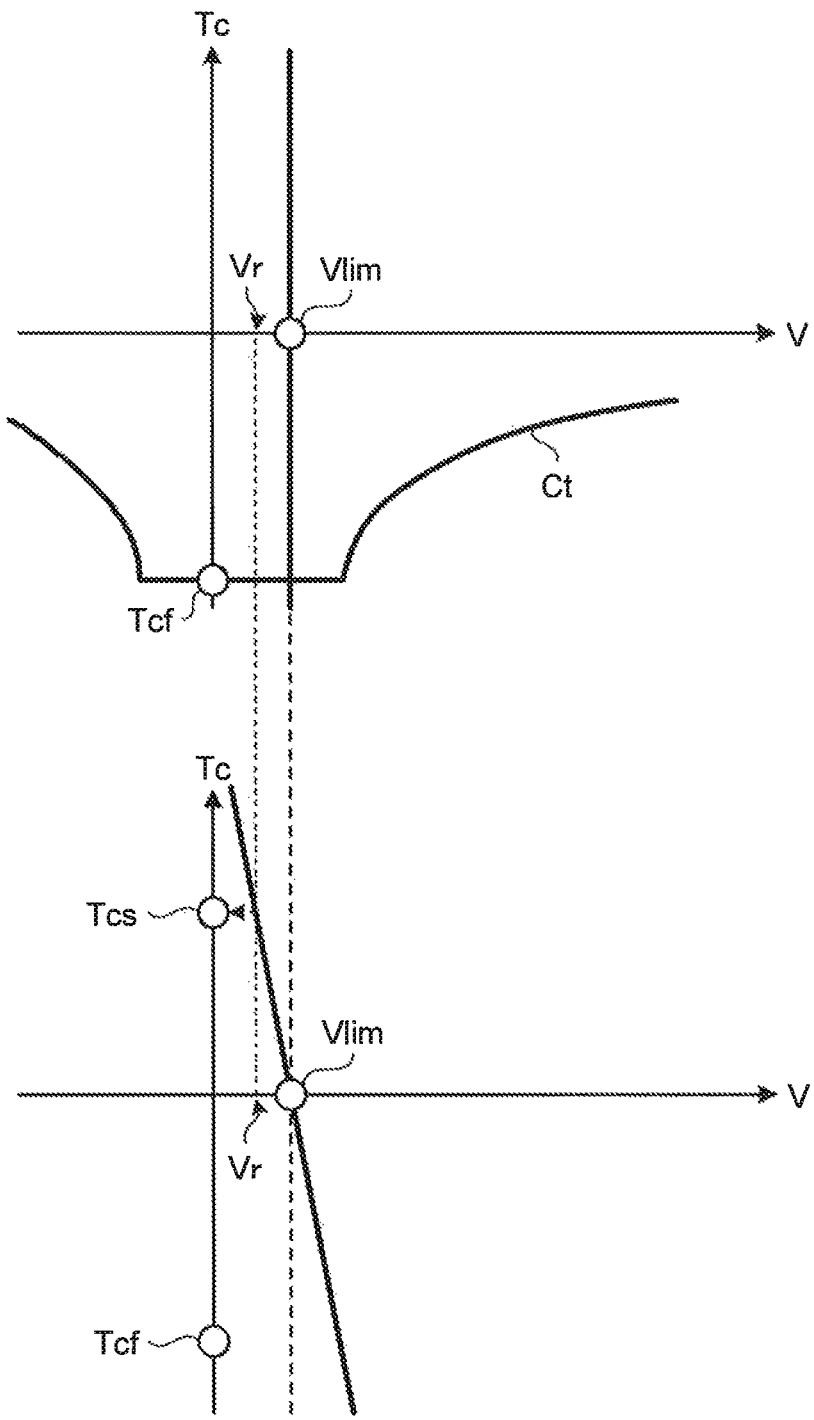
FIG. 29 is a diagram for describing the torque command value under the switch back control when the battery type forklift is on the downward slope.

FIG. 28 is a diagram illustrating a state in which the switch back control is performed when the battery type forklift is on the downward slope. FIG. 29 is a diagram for describing the torque command value under the switch back control when the battery type forklift is on the downward slope. When the slope control is changed to the switch back control, the actual running speed Vr at which the battery type forklift 1 moves forward gradually decreases. When the actual running speed Vr decreases, the speed command value generation section 104 of the first control part 101 makes the speed limitation command Vlim smaller than a previous value as described above. Since the actual running speed Vr is positive, i.e., the battery type forklift 1 moves forward, the second control part 102 sets a smaller one of the first torque command value Tcf and the second torque command value Tcs, i.e., the first torque command value Tcf in this example as the third torque command value Tci. The running motor 50 is controlled to generate the first torque command value Tcf by the inverter 54 illustrated in FIG. 4. When the actual running speed Vr of the battery type forklift 1 becomes 0 and the movement direction is reversed, the movement direction command value DR is switched from Bk to Fw. Then, since the actual movement direction of the battery type forklift 1 agrees with the movement direction command value DR, the first control part 101 and the second control part 102 control the running motor 50 based on the power running control.

In the embodiment, the first control part 101 determines the speed limitation command Vlim based on the accelerator opening ACo, the actual running speed Vr, and the actual movement direction of the battery type forklift 1. For example, under the switch back control according to the embodiment, the shift from the slope control to the switch back control can be promptly realized in such a manner that a speed whose absolute value is greater than the actual running speed Vr at a moment at which the movement direction command value DR disagrees with the actual movement direction (direction at the actual running speed Vr) of the battery type forklift 1 or the actual running speed Vr is set as the speed limitation command Vlim. In addition, a sudden change in acceleration at the shift can be prevented.

In the embodiment, the slope control and the switch back control described above are performed on the condition that the actual movement direction of the battery type forklift 1 disagrees with a movement direction defined by the movement direction command value DR. Further, the slope control is performed when the disagreement occurs with a change in the actual movement direction of the battery type forklift 1, and the switch back control is performed when the disagreement occurs with a change in the movement direction command value DR. Since the switch back control and the slope control can be definitely separated from each other by such control logic in the embodiment, the compatibility between them can be ensured. In addition, under the switch back control according to the embodiment, the speed limitation command Vlim is caused to follow only when the absolute value of the actual running speed Vr becomes small. Thus, an increase in the speed of the battery type forklift 1 is prevented even when the battery type forklift 1 enters a slope under the switch back control, whereby the compatibility between the switch back control and the slope control can be ensured. As a result, the battery type forklift 1 can be prevented from destabilizing a pack when loading and unloading a product such as Styrofoam that is likely to collapse due to its low density.

<Power Running Control>

Under the power running control, the speed command value generation section 104 of the first control part 101 illustrated in FIG. 4 changes the speed limitation command Vlim with time. In this manner, a sudden change in the actual running speed Vr can be prevented when the battery type forklift 1 starts moving. When a certain time elapses after the battery type forklift 1 starts moving, the battery type forklift 1 is controlled by the first torque command value Tcf generated by the first torque command value generation section 103, i.e., the first torque command value Tcf determined based on the tractive force curve or the braking force curve.

Figure 30:
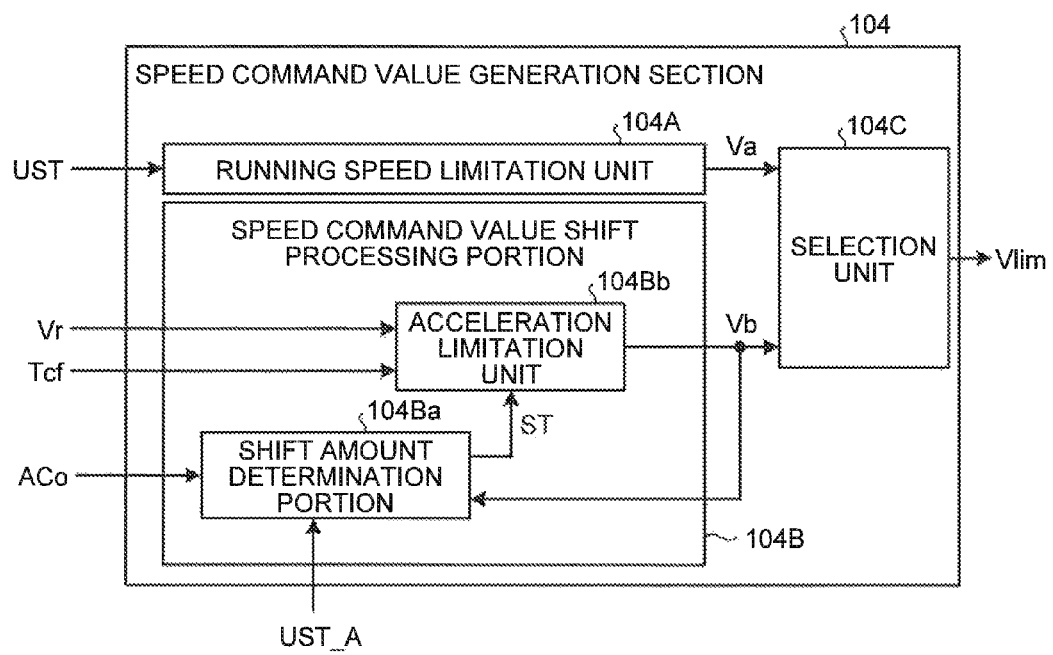
FIG. 30 is a control block diagram of the speed command value generation section of the first control part.

FIG. 30 is a control block diagram of the speed command value generation section of the first control part. The speed command value generation section 104 has a running speed limitation unit 104A, an acceleration limitation unit 104B, and a selection processing unit 104C. The running speed limitation unit 104A has the function of limiting the upper limit of the actual running speed Vr of the battery type forklift 1. The running speed limitation unit 104A has, for example, a speed limitation setting value UST_B used to limit the actual running speed V of the battery type forklift 1 and outputs this as a first speed limitation command Va. A setting value UST is input to the running speed limitation unit 104A. With the input of the setting value UST, the content of the running speed limitation unit 104A, for example, the value of the speed limitation setting value UST_B is rewritten. As a result, the running speed limitation unit 104A can output the first speed limitation command Va having a different value.

The acceleration limitation unit 104B has a shift amount determination portion 104Ba and a speed command value shift processing portion 104Bb. The accelerator opening ACo is input to the shift amount determination portion 104Ba. Based on the input accelerator opening ACo, the shift amount determination portion 104Ba determines the change amount of the speed limitation command Vlim with time, i.e., a shift amount ST. If there are no limitations put by the running speed limitation unit 104A, the speed limitation command Vlim generated and output by the speed command value generation section 104 agrees with the second speed limitation command Vb generated and output by the speed command value shift processing portion 104Bb of the acceleration limitation unit 104B. A setting value UST_A is input to the shift amount determination portion 104Ba. Based on the setting value UST_A, the change characteristics of the speed limitation command Vlim with time are changed.

The actual running speed Vr, the first torque command value Tcf generated by the first torque command value generation section 103 of the first control part 101, and the shift amount ST determined by the shift amount determination portion 104Ba are input to the speed command value shift processing portion 104Bb. The actual running speed Vr is equivalent to the motor speed N of the running motor 50. The speed command value shift processing portion 104Bb generates and outputs the second speed limitation command Vb based on the actual running speed Vr, the first torque command value Tcf, and the shift amount ST. In the embodiment, the initial value of the second speed limitation command Vb is β or −β illustrated in FIG. 8. When the direction is positive (forward movement) at the time at which the actual running speed Vr is input, the initial value of the second speed limitation command Vb is β. When the direction is negative (backward movement) at the time at which the actual running speed Vr is input, the initial value of the second speed limitation command Vb is −β.

The first speed limitation command Va and the second speed limitation command Vb are input to the selection processing unit 104C. When the actual running speed Vr is positive, i.e., when the battery type forklift 1 moves forward, the selection processing unit 104C selects a smaller one of the first speed limitation command Va and the second speed limitation command Vb and outputs the selected one of them as the speed limitation command Vlim. When the actual running speed Vr is negative, i.e., when the battery type forklift 1 moves backward, the selection processing unit 104C selects a greater one of the first speed limitation command Va and the second speed limitation command Vb and outputs the selected one of them as the speed limitation command Vlim. The selection processing unit 104C selects one having a smaller absolute value from among the first speed limitation command Va and the second speed limitation command Vb.

Figure 31:
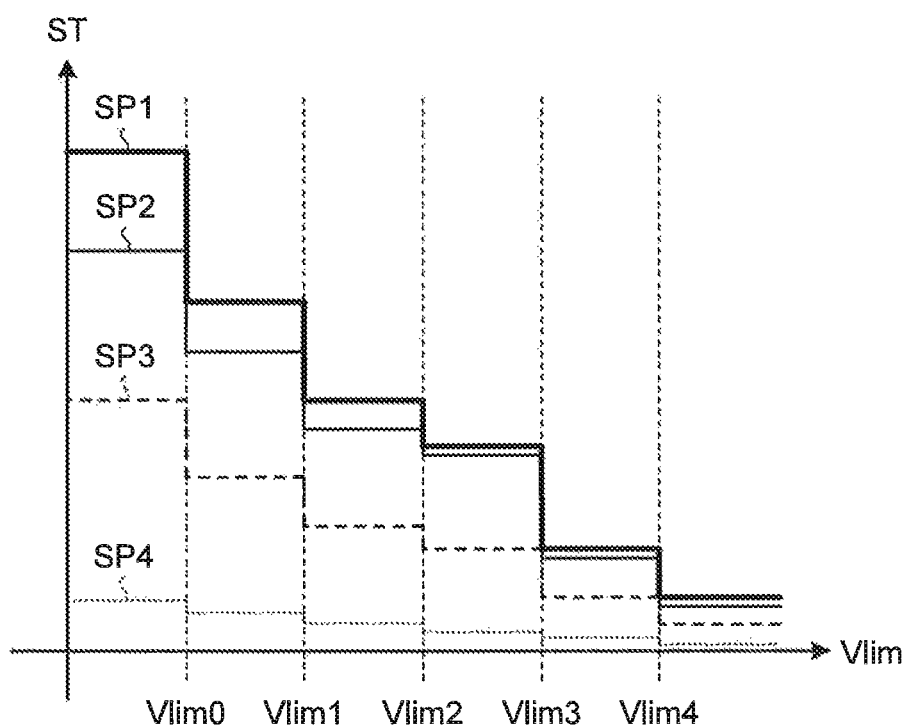
FIG. 31 is a diagram for describing the shift amount of a speed limitation command determined by a shift amount determination portion.
Figure 32:
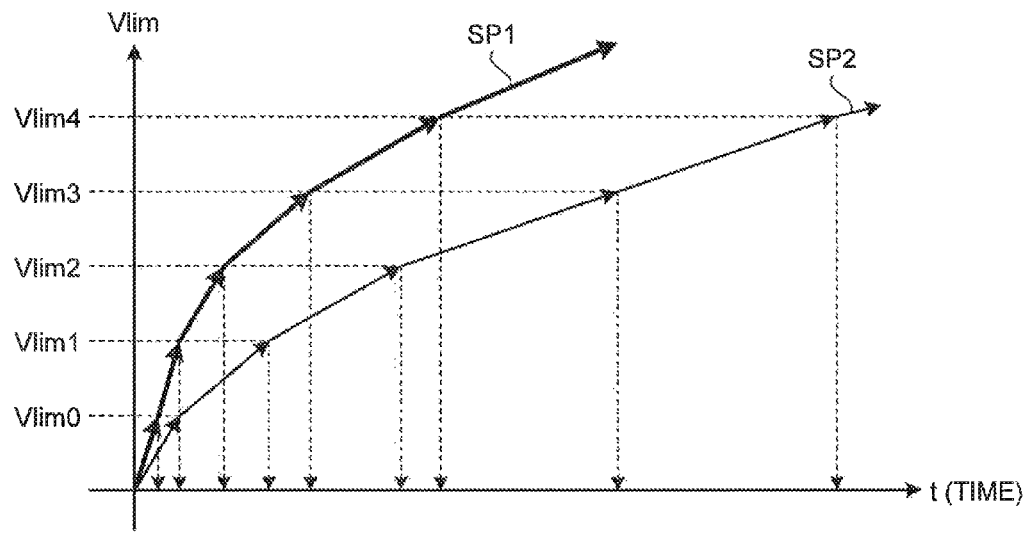
FIG. 32 is a diagram illustrating an example of a case in which the speed limitation command is caused to change based on the shift amount.

FIG. 31 is a diagram for describing the shift amount of the speed limitation command determined by the shift amount determination portion. FIG. 32 is a diagram illustrating an example of a case in which the speed limitation command is caused to change based on the shift amount. The shift amount ST of the speed limitation command Vlim is the change amount of the speed limitation command Vlim in a predetermined time and expressed in the unit of, for example, km/h/msec. In other words, the shift amount ST represents the size of the speed limitation command Vlim that changes every 1 msec.

As illustrated in FIG. 31, the shift amount ST is different depending on the size of the speed limitation command Vlim in the embodiment. In the embodiment, the greater the speed limitation command Vlim, the smaller the shift amount ST becomes. Without being limited to this, the shift amount ST may become greater as the speed limitation command Vlim are greater or may change so as to have its maximum or minimum value based on the value of a certain speed limitation command Vlim. By changing the speed limitation command Vlim every control cycle based on the shift amount ST, the speed command value generation section 104 can change the speed limitation command Vlim with time. As a result, the first control part 101 and the second control part 102 can define limitations on acceleration when the battery type forklift 1 runs.

In addition, FIG. 31 describes the four types of shift properties SP1, SP2, SP3, and SP4. For the shift properties SP1, SP2, SP3, and SP4, the shift amount ST decreases in this order at the same speed limitation command Vlim. The shift properties SP1, SP2, SP3, and SP4 are selected according to the accelerator opening ACo. In the embodiment, the shift properties change in the order of SP4, SP3, SP2, and SP1 with an increase in the accelerator opening ACo. Since the shift amount ST is caused to change based on the speed limitation command Vlim, the actual acceleration of the battery type forklift 1 can be prevented from exceeding defined acceleration when the actual running speed Vr exceeds the speed limitation command Vlim due to influence by disturbance or the like.

When the speed command value generation section 104 changes the speed limitation command Vlim based on the shift properties SP1 and SP2 or the like, the speed limitation command Vlim changes with time t as illustrated in, for example, FIG. 32. In the embodiment, the absolute value of the speed limitation command Vlim increases with the time t. SP1 and SP2 indicated by solid lines in FIG. 32 are, respectively, results obtained by changing the speed limitation command Vlim based on the shift properties SP1 and SP2c. The SP1 and SP2 indicated by the solid lines show the shortest time required when the battery type forklift 1 reaches a certain actual running speed Vr (corresponding to the speed limitation command Vlim).

In the embodiment, the speed command value generation section 104 determines whether to change the speed limitation command Vlim in an acceleration direction or a deceleration direction according to the control state of the second control part 102. The control state of the second control part 102 refers to the state of control for generating the third torque command value Tci. Specifically, the control state refers to the processing state of the second control part 102 as to whether the third torque command value Tci is generated according to the first torque command value Tcf based on the tractive force curve or the like or the second torque command value Tcs based on the speed limitation command Vlim.

Figure 33:
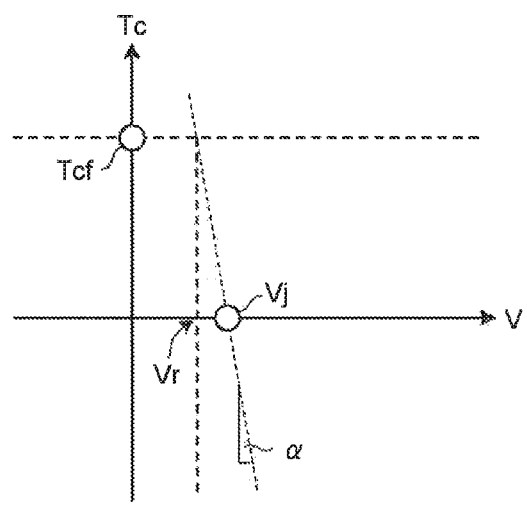
FIG. 33 is a diagram for describing an example of a method for determining the control state of the second control part with the speed command value generation section of the first control part.
Figure 34:
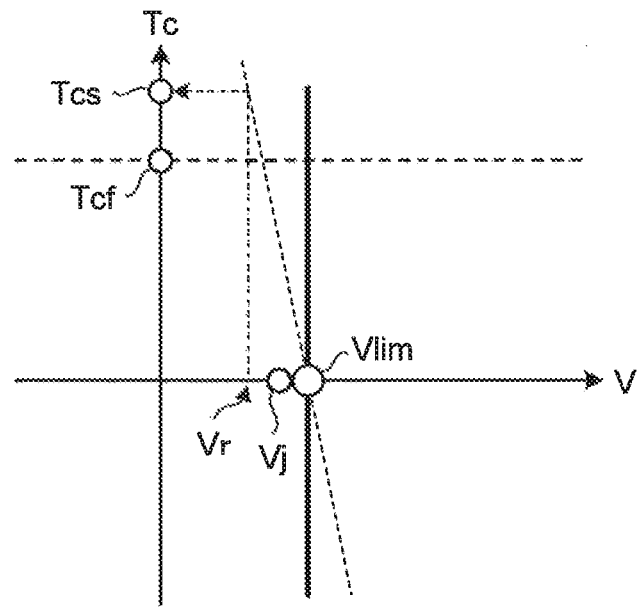
FIG. 34 is a diagram for describing an example of the method for determining the control state of the second control part with the speed command value generation section of the first control part.
Figure 35:
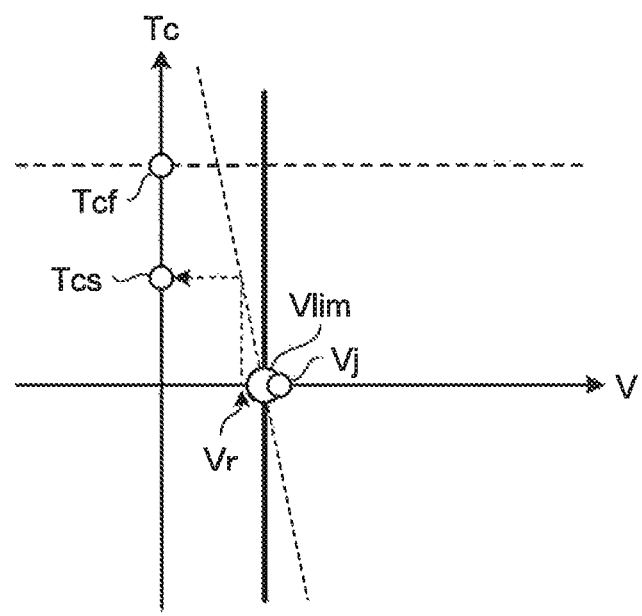
FIG. 35 is a diagram for describing an example of the method for determining the control state of the second control part with the speed command value generation section of the first control part.
Figure 36:
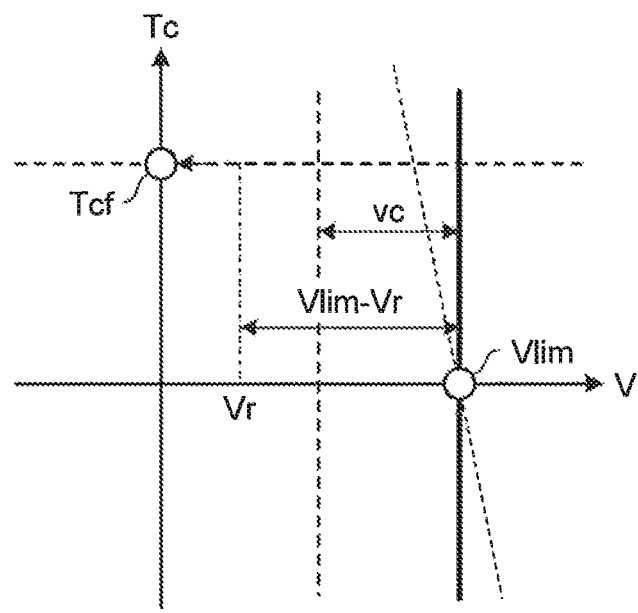
FIG. 36 is a diagram illustrating a modified example of the speed limitation command in a case in which the second control part controls the running motor according to the first torque command value.

FIGS. 33 to 35 are diagrams for describing an example of a method for determining the control state of the second control part with the speed command value generation section of the first control part. FIG. 36 is a diagram illustrating a modified example of the speed limitation command in a case in which the second control part controls the running motor according to the first torque command value. The speed command value generation section 104 of the first control part 101, more specifically the speed command value shift processing portion 104Bb calculates a speed used to perform determination (determination speed) Vj based on the first torque command value Tcf and the actual running speed Vr. As illustrated in FIG. 33, the determination speed Vj can be expressed by the following formula (1) using the coefficient α, the first torque command value Tcf, and the actual running speed Vr. The coefficient α is one used to generate the second torque command value Tcs based on the speed limitation command Vlim.

$$Vj = Tcf/\alpha + Vr \quad (1)$$

After calculating the determination speed Vj, the speed command value shift processing portion 104Bb compares the determination speed Vj with the speed limitation command Vlim in a current control cycle. When the speed limitation command Vlim is greater than the determination speed Vj as illustrated in FIG. 34, it is determined that the second control part 102 controls the running motor 50 with the first torque command value Tcf generated by the first control part 101 set as the third torque command value Tci. When the determination speed Vj is greater than the speed limitation command Vlim as illustrated in FIG. 35, it is determined that the second control part 102 controls the running motor 50 with the second torque command value Tcs generated based on the speed limitation command Vlim set as the third torque command value Tci. Note that the speed command value shift processing portion 104Bb may directly acquire the control state of the second control part 102 via the communication line 110 illustrated in FIG. 3.

When it is determined that the second control part 102 controls the running motor 50 according to the second torque command value Tcs, the speed command value shift processing portion 104Bb changes the second speed limitation command Vb (speed limitation command Vlim) so as to increase the absolute value by the shift amount ST determined by the shift amount determination portion 104Ba. In this manner, the first control part 101 and the second control part 102 can accelerate the battery type forklift 1 at the acceleration defined by the shift properties SP1 and SP2 of the shift amount ST or the like.

When it is determined that the second control part 102 controls the running motor 50 according to the first torque command value Tcf, the operator of the battery type forklift 1 may increase the pressing of the accelerator pedal 37 with the recognition that expected acceleration cannot be obtained if the difference (Vlim−Vr) between the speed limitation command Vlim and the current actual running speed Vr becomes large. As a result, there is a likelihood of a sudden increase in the battery type forklift 1 occurring. When the running resistance of the battery type forklift 1 is large, the difference (Vlim−Vr) may become large due to insufficient acceleration.

In this case, the speed command value shift processing portion 104Bb performs the following control. As illustrated in FIG. 36, when the difference (Vlim−Vr) between the speed limitation command Vlim and the current actual running speed Vr becomes greater than equal to or a predetermined threshold (for example, a speed vc), the speed command value shift processing portion 104Bb decreases the absolute value of the speed limitation command Vlim. In this manner, the difference between the speed limitation command Vlim and the current actual running speed Vr becomes small.

When the battery type forklift 1 moves forward, the running motor 50 is controlled based on a smaller one of the first torque command value Tcf and the second torque command value Tcs. When the difference between the speed limitation command Vlim and the current actual running speed Vr becomes small, the second torque command value Tcs based on the speed limitation command Vlim and the actual running speed Vr also becomes small. Therefore, for example, when the operator increases the pressing of the accelerator pedal 37, the first torque command value Tcf based on the tractive force curve or the like suddenly increases. However, since the increase in the second torque command value Tcs based on the speed limitation command Vlim is prevented, the latter is highly likely to be selected. As a result, since the power running control is performed by the second torque command value Tcs based on the speed limitation command Vlim and the second torque command value Tcs does not suddenly increase, the battery type forklift 1 is prevented from suddenly accelerating.

Figure 37:
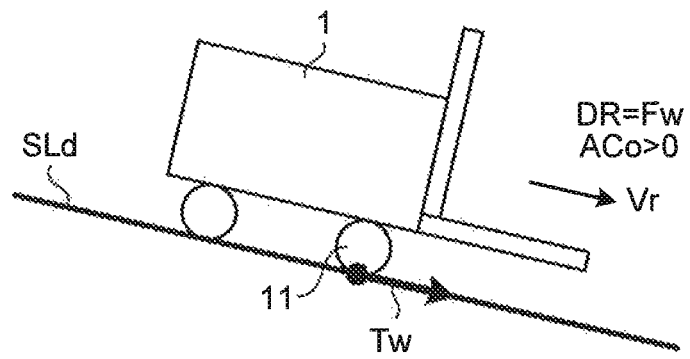
FIG. 37 is a diagram illustrating a state in which the accelerator pedal is opened when the battery type forklift is on the downward slope.
Figure 38:
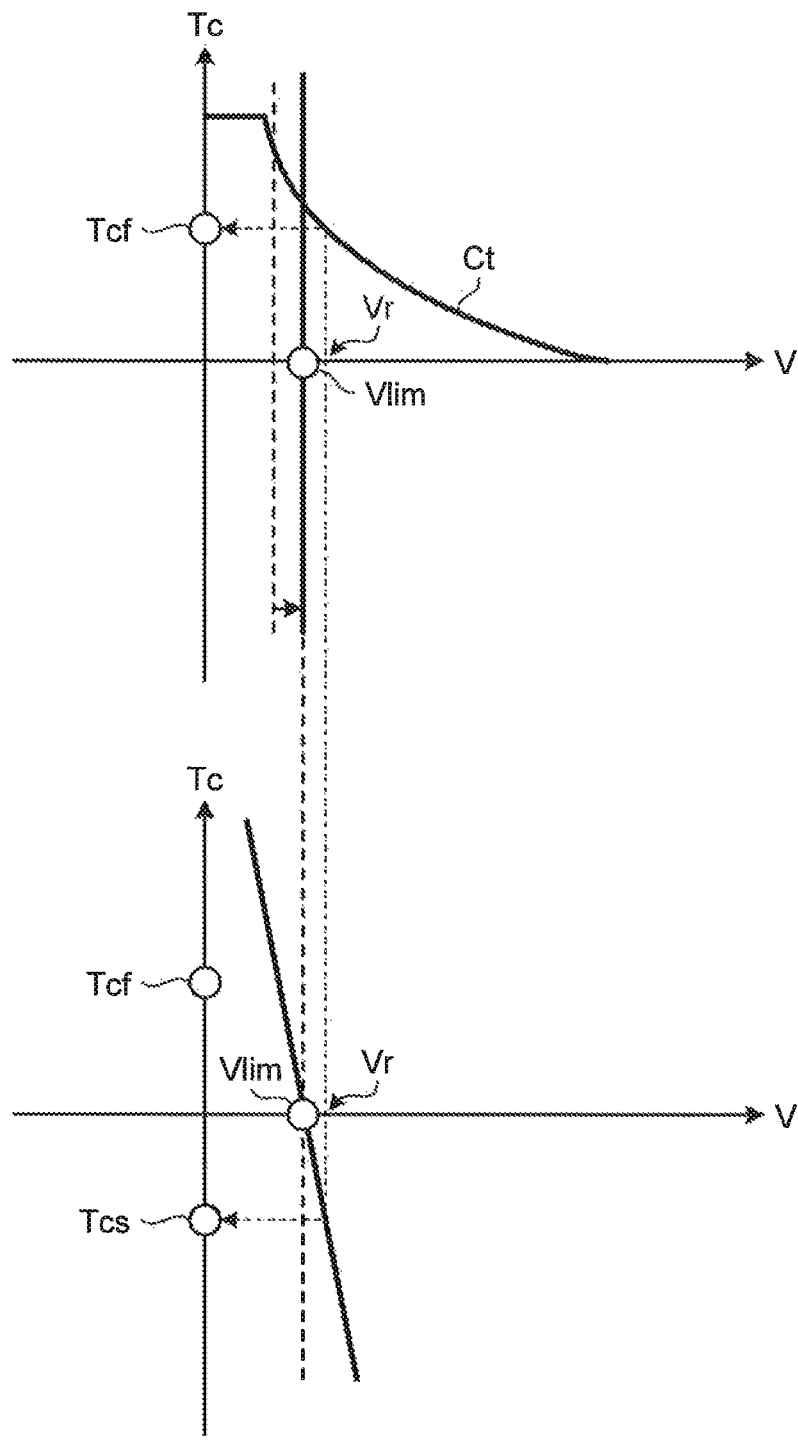
FIG. 38 is a diagram for describing the torque command value in a case in which the accelerator pedal is opened when the battery type forklift is on the downward slope.

FIG. 37 is a diagram illustrating a state in which the accelerator pedal is opened when the battery type forklift is on the downward slope. FIG. 38 is a diagram for describing the torque command value in a case in which the accelerator pedal is opened when the battery type forklift is on the downward slope. When the accelerator pedal 37 is pressed to be opened (ACo>0) during the above slope control (see FIGS. 13 and 14), the running motor 50 is controlled based on the power running control.

In performing the power running control according to the embodiment, the first control part 101 and the second control part 102 control the running motor 50 based on the speed limitation command Vlim and increases the absolute value of the speed limitation command Vlim with time when the actual running speed Vr is greater than the speed limitation command Vlim as illustrated in FIG. 37. In this manner, in order to cause the battery type forklift 1 to move forward on the downward slope SLd, the running motor 50 and the front wheels 11 that have generated a negative torque (torque in the direction in which the battery type forklift moves backward on the downward slope SLd) under the slope control are caused to generate a positive torque TW. At this time, since the absolute value of the speed limitation command Vlim is caused to increase with time, the sudden reverse of the torque generated by the running motor 50 and the front wheels 11 is prevented. As a result, under the power running control according to the embodiment, the battery type forklift 1 that performs the power running and the forward movement on the downward slope SLd can be prevented from suddenly accelerating.

Under the power running control according to the embodiment, the speed limitation command Vlim is caused to change with time, more specifically the absolute value of the speed limitation command Vlim is caused to increase with time if the accelerator opening ACo is greater than 0. In this manner, since the torque of the running motor 50 is controlled by the second torque command value Tcs based on the speed limitation command Vlim immediately after the battery type forklift 1 starts moving, a sudden increase in the torque is prevented. As a result, the battery type forklift 1 can be prevented from destabilizing a pack when loading and unloading a product such as Styrofoam that is likely to collapse due to its low density. In addition, since the speed limitation command Vlim increases with time, the torque of the running motor 50 is controlled by the first torque command value Tcf based on the tractive force curve or the like when a certain time elapses after the battery type forklift 1 starts moving. As a result, drivability becomes excellent with an improvement in a response to the operation of the accelerator pedal 37.

When the second control part 102 generates the second torque command value Tcs based on the speed limitation command Vlim, an increase in the coefficient α leads to the rapid rise of the second torque command value Tcs even if the actual running speed Vr changes slightly, which improves the response and easily realizes a set running speed. In addition, in the embodiment, the first control part 101 and the second control part 102 are connected to each other by the communication line 110, and the second torque command value Tcs is generated inside the second control part 102. When the first control part 101 generates the first torque command Tcf based on the speed limitation command Vlim, a communication delay is caused until the output of the running motor 50 is generated based on the command from the first control part 101. In this case, when the change in the actual running speed Vr is large, the increase in the coefficient α causes the separation between the output of the torque generated by the running motor 50 based on the command of the first control part 101 and that of a torque desired to be actually output, which may result in the occurrence of hunting. Therefore, for the first torque command Tcf from the first control part 101, there is need to decrease the coefficient α to prevent the occurrence of hunting due to the communication delay. Conversely, in the embodiment, there is no need to consider the above communication delay since the second torque command value Tcs is generated inside the second control part 102. As a result, the coefficient α can be increased.

The embodiment is given as described above but is not limited to the above contents. In addition, the above constituents include matter that could be easily conceived by persons skilled in the art and substantially equivalent matter, i.e., matter within the range of equivalency. Moreover, the above constituents may be appropriately combined together. Furthermore, the various omissions, replacements, or modifications of the constituents can be performed without departing from the spirit of the embodiment.

REFERENCE SIGNS LIST

1 Battery type forklift
2 Control system
10 Vehicle body
11 Front wheel
12 Rear wheel
13 Fork
30 Battery
50 Running motor
50R Speed detection sensor
51 Power transmission device
52 Operations panel
53 DC/DC converter
54 Inverter
101 First control part
102 Second control part
103 First torque command value generation section
104 Speed command value generation section
104A Running speed limitation unit
104B Acceleration limitation unit
104Ba Shift amount determination portion
104Bb Speed command value shift processing portion
104C Selection processing unit
105 Second torque command value generation section
106 Torque command value generation section
107 Subtraction unit
108 Multiplication unit
110 Communication line
ACo Accelerator opening
Ct, Ct1, Ct2 Torque command curve DR Movement direction command value
Im Drive current
N Motor speed
ST Shift amount
Tc Torque command value
Vlim Speed limitation command
Va First speed limitation command
Vb Second speed limitation command
Vr, Vr1, Vr2, Vr3, Vr4 Actual running speed
α Coefficient

The invention claimed is:

1. A work vehicle having at least a running motor, the work vehicle comprising:
a first control part that generates a speed command value used to control the motor and adds an actual running speed of the work vehicle to a relationship between a torque command value as a command value for a torque to be generated in the motor and a running speed of the work vehicle to generate a first torque command value; and
a second control part that generates a second torque command value based on the speed command value generated by the first control part and the actual running speed, controls the motor using a smaller one of the first torque command value and the second torque command value when the work vehicle moves forward, and controls the motor using a greater one of the first torque command value and the second torque command value when the work vehicle moves backward, wherein,
when an actual movement direction of the work vehicle disagrees with a movement direction command value used to define a movement direction of the work vehicle such that the directions are opposite, the first control part determines the speed command value based on the actual running speed generated when the disagreement occurs, when the actual movement direction of the work vehicle disagrees with an intended movement direction of the work vehicle on a downward slope during a control of preventing the work vehicle from slipping down on a slope.

2. The work vehicle according to claim 1, wherein the first control part makes the speed command value greater than an absolute value of the actual running speed generated when the disagreement occurs.

3. The work vehicle according to claim 1, wherein the first control part prevents the speed command value from being greater than the value generated when the disagreement occurs.

4. The work vehicle according to claim 1, wherein the first control part makes the absolute value of the speed command value greater than 0 when the actual running speed changes from 0.

5. The work vehicle according to claim 4, wherein a rotor has a permanent magnet in the motor.

6. The work vehicle according to claim 1, wherein a relationship between the first torque command value and the running speed of the work vehicle changes with an accelerator opening of the work vehicle.

7. The work vehicle according to claim 1, wherein the first control part decreases the speed command value as the actual running speed becomes closer to 0.

8. A work vehicle having at least a running motor, the work vehicle comprising:
a first control part that generates a speed command value used to control the motor and adds an actual running speed of the work vehicle to a relationship between a torque command value as a command value for a torque to be generated in the motor and a running speed of the work vehicle to generate a first torque command value; and
a second control part that generates a second torque command value based on the speed command value generated by the first control part and the actual running speed, controls the motor using a smaller one of the first torque command value and the second torque command value when the work vehicle moves forward, and controls the motor using a greater one of the first torque command value and the second torque command value when the work vehicle moves backward, wherein
the first control part determines the speed command value based on an actual movement direction of the work vehicle and a movement direction command value used to define a movement direction of the work vehicle, determines, when the actual movement direction disagrees with the movement direction command used to define the movement direction of the work vehicle such that the directions are opposite, the speed command value based on the speed generated when the disagreement occurs, and makes an absolute value of the speed command value greater than 0 when the actual running speed changes from 0, when the actual movement direction of the work vehicle disagrees with an intended movement direction of the work vehicle on a downward slope during a control of preventing the work vehicle from slipping down on a slope.

* * * * *